(12) United States Patent
Karafin et al.

(10) Patent No.: US 11,796,733 B2
(45) Date of Patent: Oct. 24, 2023

(54) ENERGY RELAY AND TRANSVERSE ANDERSON LOCALIZATION FOR PROPAGATION OF TWO-DIMENSIONAL, LIGHT FIELD AND HOLOGRAPHIC ENERGY

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 1264 days.

(21) Appl. No.: 16/063,675

(22) PCT Filed: Jul. 17, 2017

(86) PCT No.: PCT/US2017/042470
§ 371 (c)(1),
(2) Date: Jun. 18, 2018

(87) PCT Pub. No.: WO2018/014048
PCT Pub. Date: Jan. 18, 2018

(65) Prior Publication Data
US 2020/0301164 A1 Sep. 24, 2020

Related U.S. Application Data

(60) Provisional application No. 62/507,500, filed on May 17, 2017, provisional application No. 62/366,076, (Continued)

(51) Int. Cl.
*G02B 27/09* (2006.01)
*G02B 30/00* (2020.01)
(Continued)

(52) U.S. Cl.
CPC ........ *G02B 6/0096* (2013.01); *G02B 6/023* (2013.01); *G02B 6/02042* (2013.01); *G02B 6/04* (2013.01);
(Continued)

(58) Field of Classification Search
CPC ........ G02B 3/0056; G02B 3/08; G02B 5/32; G02B 6/02042; G02B 6/0229;
(Continued)

(56) References Cited

U.S. PATENT DOCUMENTS 3,870,399 A 3/1975 Randall et al.
4,087,159 A 5/1978 Ulrich
(Continued)

FOREIGN PATENT DOCUMENTS

CN 101095244 A 12/2007
CN 102231044 A 11/2011
(Continued)

OTHER PUBLICATIONS

AU-2017296073 Examination Report No. 1 dated Aug. 15, 2018.
(Continued)

*Primary Examiner* — Stephone B Allen
*Assistant Examiner* — Jyotsna V Dabbi
(74) *Attorney, Agent, or Firm* — Charles C. Yang

(57) ABSTRACT

Energy systems are configured to direct energy according to a four-dimensional (4D) plenoptic function. In general, the energy systems include a plurality of energy devices, an energy relay system having one or more relay elements arranged to form a singular seamless energy surface, and an energy waveguide system such that energy can be relayed along energy propagation paths through the energy waveguide system to the singular seamless energy surface or from
(Continued)

the singular seamless energy surface through the energy relay system to the plurality of energy devices.

21 Claims, 23 Drawing Sheets

Related U.S. Application Data filed on Jul. 24, 2016, provisional application No. 62/362,602, filed on Jul. 15, 2016.

(51) Int. Cl.

| | |
|---|---|
| *G02B 30/33* | (2020.01) |
| *G02B 6/02* | (2006.01) |
| *G02B 6/04* | (2006.01) |
| *G02B 27/10* | (2006.01) |
| *G02B 6/293* | (2006.01) |
| *G02B 6/08* | (2006.01) |
| *G02B 30/56* | (2020.01) |
| *F21V 8/00* | (2006.01) |
| *H04N 13/388* | (2018.01) |
| *G02B 27/01* | (2006.01) |
| *G02B 25/00* | (2006.01) |
| *G03H 1/22* | (2006.01) |
| *H04N 5/89* | (2006.01) |
| *G02B 27/00* | (2006.01) |
| *H04N 23/957* | (2023.01) |
| *G10K 11/26* | (2006.01) |
| *G21K 1/00* | (2006.01) |
| *G02B 3/00* | (2006.01) |
| *G02B 3/08* | (2006.01) |
| *H04N 13/344* | (2018.01) |
| *G02B 5/32* | (2006.01) |
| *G03H 1/02* | (2006.01) |
| *G06F 3/01* | (2006.01) |
| *G03H 1/00* | (2006.01) |

(52) U.S. Cl.
CPC ........... *G02B 6/08* (2013.01); *G02B 6/29325* (2013.01); *G02B 27/0172* (2013.01); *G02B 27/0955* (2013.01); *G02B 27/0994* (2013.01); *G02B 27/1066* (2013.01); *G02B 30/00* (2020.01); *G02B 30/33* (2020.01); *H04N 13/388* (2018.05); *G02B 3/0056* (2013.01); *G02B 3/08* (2013.01); *G02B 5/32* (2013.01); *G02B 6/0229* (2013.01); *G02B 6/02295* (2013.01); *G02B 25/00* (2013.01); *G02B 25/002* (2013.01); *G02B 27/0093* (2013.01); *G02B 27/0103* (2013.01); *G02B 27/1073* (2013.01); *G02B 30/56* (2020.01); *G02B 2027/0105* (2013.01); *G02B 2027/0134* (2013.01); *G02B 2027/0174* (2013.01); *G03H 1/0005* (2013.01); *G03H 1/0248* (2013.01); *G03H 1/2202* (2013.01); *G03H 1/2294* (2013.01); *G03H 2001/0088* (2013.01); *G03H 2223/19* (2013.01); *G06F 3/01* (2013.01); *G06F 3/013* (2013.01); *G10K 11/26* (2013.01); *G21K 1/00* (2013.01); *H04N 5/89* (2013.01); *H04N 13/344* (2018.05); *H04N 23/957* (2023.01); *Y02E 10/52* (2013.01)

(58) Field of Classification Search
CPC ...... G02B 6/02295; G02B 6/023; G02B 6/04; G02B 6/08; G02B 6/29325; G02B 17/0864; G02B 27/01; G02B 27/0101; G02B 27/0103; G02B 27/0172; G02B 27/095; G02B 27/0994; G02B 27/1066; G02B 27/1073; G02B 30/00; G02B 30/25; G02B 30/33; G02B 30/34; G02B 30/56; G02B 30/60; G02B 2027/0134; G02B 2027/0105; G02B 2027/0174; G02B 25/00; G02B 25/002; G06F 3/01; G06F 3/011; G06F 3/013; G06F 3/0304; G10K 11/26; G21K 1/00; H04N 5/22541; H04N 5/89; H04N 13/246; H04N 13/344; H04N 13/388; Y02E 10/52; G03H 1/00; G03H 1/0005; G03H 1/0248; G03H 1/2202; G03H 1/2294; G03H 2001/0088; G03H 2223/19

USPC ....................................................... 359/462
See application file for complete search history.

(56) References Cited

U.S. PATENT DOCUMENTS

| | | |
|---|---|---|
| 4,099,833 A | 7/1978 | Tosswill |
| 4,134,642 A | 1/1979 | Kapron et al. |
| 4,149,772 A | 4/1979 | Iyengar et al. |
| 4,265,515 A | 5/1981 | Kao |
| 5,187,260 A | 2/1993 | Karali et al. |
| 5,187,360 A | 2/1993 | Pasco |
| 5,371,826 A | 12/1994 | Friedman |
| 5,374,976 A | 12/1994 | Spannenburg |
| 5,396,350 A | 3/1995 | Beeson et al. |
| 5,479,550 A | 12/1995 | Nishioka et al. |
| 5,481,385 A | 1/1996 | Zimmerman et al. |
| 5,519,801 A | 5/1996 | Noane et al. |
| 5,553,184 A | 9/1996 | Eikelmann et al. |
| 5,822,125 A | 10/1998 | Meyers |
| 5,974,215 A | 10/1999 | Bilbro et al. |
| 6,041,154 A | 3/2000 | Ono et al. |
| 6,169,594 B1 | 1/2001 | Aye et al. |
| 6,384,400 B1 | 5/2002 | Albagli et al. |
| 6,487,351 B1 | 11/2002 | Cryan et al. |
| 6,611,648 B2 | 8/2003 | Kumar et al. |
| 6,614,972 B1 | 9/2003 | Lundin |
| 6,680,761 B1 | 1/2004 | Greene et al. |
| 7,050,020 B2 | 5/2006 | Uehara et al. |
| 7,235,047 B2 | 6/2007 | MacAulay et al. |
| 7,329,982 B2 | 2/2008 | Conner et al. |
| 7,376,314 B2 | 5/2008 | Reininger |
| 7,773,849 B2 | 8/2010 | Shani |
| 7,986,374 B2 | 7/2011 | Ijzerman et al. |
| 8,149,265 B2 | 4/2012 | Smalley et al. |
| 8,369,546 B2 | 2/2013 | Pompei |
| 8,406,595 B2 | 3/2013 | Hayashi |
| 8,477,906 B2 | 7/2013 | Morse et al. |
| 8,736,675 B1 | 5/2014 | Holzbach et al. |
| 8,743,466 B2 | 6/2014 | Yamamoto |
| 8,879,766 B1 | 11/2014 | Zhang |
| 8,953,012 B2 | 2/2015 | Williams et al. |
| 9,158,080 B2 | 10/2015 | Logunov et al. |
| 9,256,060 B2 | 2/2016 | Kobori et al. |
| 9,411,511 B1 | 8/2016 | Sivertsen |
| 9,494,738 B1 | 11/2016 | Farmer et al. |
| 9,612,395 B2 | 4/2017 | Karbasivalashani et al. |
| 9,835,812 B2 | 12/2017 | Yadlowsky |
| 9,874,761 B2 | 1/2018 | Putten et al. |
| 9,904,065 B2 | 2/2018 | Jin et al. |
| 9,945,985 B2 | 4/2018 | Morasse |
| 9,945,988 B2 | 4/2018 | Powell |
| 10,009,597 B2 | 6/2018 | Karafin et al. |
| 10,052,831 B2 | 8/2018 | Welker et al. |
| 10,094,974 B2 | 10/2018 | Chen et al. |
| 10,132,993 B2 | 11/2018 | Buczynski et al. |
| 10,432,919 B2 | 10/2019 | Lapstun |
| 10,488,584 B2 | 11/2019 | Karafin et al. |
| 10,560,689 B2 | 2/2020 | Lapstun |
| 10,860,142 B1 | 12/2020 | Northcott et al. |
| 10,884,142 B2 | 1/2021 | Welker |
| 11,221,670 B2 | 1/2022 | Karafin et al. |
| 11,556,015 B2 | 1/2023 | Karafin et al. |

(56) References Cited

U.S. PATENT DOCUMENTS

| | | |
|---|---|---|
| 2002/0021501 A1 | 2/2002 | Kawashima et al. |
| 2002/0172478 A1 | 11/2002 | Sahlin |
| 2003/0026567 A1 | 2/2003 | Cryan et al. |
| 2003/0030912 A1 | 2/2003 | Gleckman et al. |
| 2003/0137730 A1 | 7/2003 | Fridman et al. |
| 2004/0108806 A1 | 6/2004 | Cok et al. |
| 2004/0135100 A1 | 7/2004 | Menon et al. |
| 2004/0240777 A1 | 12/2004 | Woodgate et al. |
| 2005/0041944 A1 | 2/2005 | Cryan et al. |
| 2005/0119575 A1 | 6/2005 | Ladabaum et al. |
| 2005/0243275 A1 | 11/2005 | Curatu |
| 2006/0028400 A1 | 2/2006 | Lapstun et al. |
| 2006/0077319 A1 | 4/2006 | Kitamura |
| 2006/0146428 A1 | 7/2006 | Lim et al. |
| 2006/0165358 A1 | 7/2006 | Trebst et al. |
| 2006/0191566 A1 | 8/2006 | Schaafsma |
| 2007/0091638 A1 | 4/2007 | Ijzerman et al. |
| 2007/0097108 A1 | 5/2007 | Brewer |
| 2007/0291504 A1 | 12/2007 | Lu |
| 2008/0023137 A1 | 1/2008 | Jiang et al. |
| 2008/0035834 A1 | 2/2008 | Gleckler |
| 2008/0144174 A1* | 6/2008 | Lucente ............... H04N 13/307 359/463 |
| 2008/0170293 A1 | 7/2008 | Lucente et al. |
| 2008/0192313 A1 | 8/2008 | Matsumura et al. |
| 2008/0285125 A1 | 11/2008 | Lee et al. |
| 2009/0040294 A1 | 2/2009 | Smalley et al. |
| 2009/0085831 A1 | 4/2009 | Odoi et al. |
| 2009/0164397 A1 | 6/2009 | Kwok |
| 2009/0235750 A1 | 9/2009 | Chang |
| 2009/0247305 A1 | 10/2009 | Kanekal |
| 2009/0266992 A1 | 10/2009 | Beekman |
| 2009/0273538 A1 | 11/2009 | Smith et al. |
| 2009/0273575 A1 | 11/2009 | Pryor |
| 2010/0245824 A1 | 9/2010 | Schwarz |
| 2010/0265457 A1 | 10/2010 | Chomyn et al. |
| 2010/0272234 A1 | 10/2010 | Morse et al. |
| 2010/0278480 A1 | 11/2010 | Vasylyev |
| 2011/0012895 A1 | 1/2011 | Lucente et al. |
| 2011/0094269 A1 | 4/2011 | Mukasa |
| 2011/0134040 A1 | 6/2011 | Duparre et al. |
| 2011/0169832 A1 | 7/2011 | Brown et al. |
| 2011/0242461 A1 | 10/2011 | Escuti et al. |
| 2011/0254916 A1 | 10/2011 | Fan et al. |
| 2012/0206390 A1 | 8/2012 | Ueno et al. |
| 2012/0206726 A1 | 8/2012 | Pervez et al. |
| 2012/0224062 A1 | 9/2012 | Lacoste et al. |
| 2012/0268950 A1 | 10/2012 | Parkyn et al. |
| 2012/0300044 A1 | 11/2012 | Thomas et al. |
| 2013/0076930 A1 | 3/2013 | Border et al. |
| 2013/0082905 A1 | 4/2013 | Ranieri et al. |
| 2013/0088785 A1 | 4/2013 | Yamamoto |
| 2013/0127832 A1 | 5/2013 | Lee |
| 2013/0163089 A1 | 6/2013 | Bohn |
| 2013/0195410 A1 | 8/2013 | Karbasivalashani et al. |
| 2013/0265485 A1 | 10/2013 | Kang |
| 2014/0035959 A1 | 2/2014 | Lapstun |
| 2014/0043370 A1 | 2/2014 | Payne et al. |
| 2014/0072141 A1 | 3/2014 | Cohen |
| 2014/0126322 A1 | 5/2014 | Cipolla et al. |
| 2014/0132694 A1 | 5/2014 | Shacham et al. |
| 2014/0184496 A1 | 7/2014 | Gribetz et al. |
| 2014/0192087 A1* | 7/2014 | Frost .................. G06F 3/0325 345/633 |
| 2014/0253613 A1 | 9/2014 | Gilbert |
| 2014/0293385 A1 | 10/2014 | Smithwick |
| 2014/0300694 A1 | 10/2014 | Smalley et al. |
| 2014/0300695 A1 | 10/2014 | Smalley et al. |
| 2014/0300709 A1 | 10/2014 | Futterer et al. |
| 2014/0320530 A1 | 10/2014 | Gruber et al. |
| 2014/0358002 A1 | 12/2014 | Daoura |
| 2014/0371353 A1 | 12/2014 | Mitchell et al. |
| 2015/0007025 A1 | 1/2015 | Sassi |
| 2015/0022754 A1 | 1/2015 | Jepsen |
| 2015/0085464 A1 | 3/2015 | Suzuki |
| 2015/0146132 A1 | 5/2015 | Katsuta et al. |
| 2015/0185841 A1 | 7/2015 | Levesque |
| 2015/0192995 A1 | 7/2015 | Subramanian |
| 2015/0201186 A1 | 7/2015 | Smithwick |
| 2015/0212274 A1 | 7/2015 | Kopp et al. |
| 2015/0219940 A1 | 8/2015 | Kim et al. |
| 2015/0241608 A1 | 8/2015 | Shian et al. |
| 2015/0277378 A1 | 10/2015 | Smithwick et al. |
| 2016/0004055 A1* | 1/2016 | Delsaut ................ F24S 23/80 359/853 |
| 2016/0070059 A1 | 3/2016 | Chen et al. |
| 2016/0091786 A1 | 3/2016 | Kazmierski et al. |
| 2016/0139402 A1 | 5/2016 | Lapstun |
| 2016/0170372 A1 | 6/2016 | Smithwick |
| 2016/0180511 A1 | 6/2016 | Zhou et al. |
| 2016/0205394 A1 | 7/2016 | Meng et al. |
| 2016/0223988 A1 | 8/2016 | Bove |
| 2016/0274539 A1 | 9/2016 | Smithwick |
| 2016/0282614 A1* | 9/2016 | Zagolla ............... H02S 20/32 |
| 2016/0282808 A1 | 9/2016 | Smalley |
| 2017/0016996 A1 | 1/2017 | Welker et al. |
| 2017/0214907 A1 | 7/2017 | Lapstun |
| 2017/0289530 A1 | 10/2017 | Smithwick et al. |
| 2017/0363805 A1 | 12/2017 | Iwakawa |
| 2018/0063519 A1 | 3/2018 | Smithwick et al. |
| 2018/0084245 A1 | 3/2018 | Lapstun |
| 2018/0128973 A1 | 5/2018 | Powell et al. |
| 2018/0356591 A1 | 12/2018 | Karafin et al. |
| 2018/0372926 A1 | 12/2018 | Karafin et al. |
| 2018/0372958 A1 | 12/2018 | Karafin et al. |
| 2019/0004228 A1 | 1/2019 | Bevensee et al. |
| 2019/0004319 A1 | 1/2019 | Karafin et al. |
| 2019/0004326 A1 | 1/2019 | Karafin et al. |
| 2019/0011621 A1 | 1/2019 | Karafin et al. |
| 2019/0227226 A1 | 7/2019 | Abaie et al. |
| 2020/0124746 A1 | 4/2020 | Welker |
| 2020/0394791 A1 | 12/2020 | Pang et al. |
| 2021/0063766 A1 | 3/2021 | Karafin et al. |
| 2021/0253468 A1 | 8/2021 | Wood et al. |

FOREIGN PATENT DOCUMENTS

| | | |
|---|---|---|
| CN | 102591124 A | 7/2012 |
| CN | 103616770 A | 3/2014 |
| CN | 103777455 A | 5/2014 |
| CN | 105334690 A | 2/2016 |
| CN | 105637415 A | 6/2016 |
| GB | 2253070 A | 8/1992 |
| JP | H08179131 A | 7/1996 |
| JP | H10186275 A | 7/1998 |
| JP | 2000066132 A | 3/2000 |
| JP | 2000347046 A | 12/2000 |
| JP | 2003524205 A | 8/2003 |
| JP | 2003330109 A | 11/2003 |
| JP | 2004078123 A | 3/2004 |
| JP | 2007025601 A | 2/2007 |
| JP | 2007512954 A | 5/2007 |
| JP | 2008052010 A | 3/2008 |
| JP | 2008058583 A | 3/2008 |
| JP | 2008518473 A | 5/2008 |
| JP | 2009053263 A | 3/2009 |
| JP | 2009169142 A | 7/2009 |
| JP | 2009169143 A | 7/2009 |
| JP | 2009530661 A | 8/2009 |
| JP | 2010536069 A | 11/2010 |
| JP | 2011090272 A | 5/2011 |
| JP | 2014142368 A | 8/2014 |
| JP | 2016518629 A | 6/2016 |
| JP | 7063520 B2 | 5/2022 |
| TW | 200402012 A | 2/2004 |
| TW | 200633258 A | 9/2006 |
| TW | 200700695 A | 1/2007 |
| WO | 0106287 A1 | 1/2001 |
| WO | 0154106 A2 | 7/2001 |
| WO | 2005057670 A2 | 6/2005 |
| WO | 2008048360 A2 | 4/2008 |
| WO | 2011158752 A1 | 12/2011 |
| WO | 2012029081 A1 | 3/2012 |
| WO | 2013172233 A1 | 11/2013 |

(56) References Cited

FOREIGN PATENT DOCUMENTS

| WO | 2014002526 A1 | 1/2014 |
|---|---|---|
| WO | 2014188149 | 11/2014 |
| WO | 2016046514 | 3/2016 |
| WO | 2017127897 A1 | 8/2017 |
| WO | 2019140348 A2 | 7/2019 |

OTHER PUBLICATIONS

AU-2017296074 Notice of Acceptance dated Mar. 12, 2020.
AU-2017296234 Examination Report No. 1 dated Jul. 19, 2018.
AU-2017296234 Examination Report No. 2 dated Sep. 24, 2018.
AU-2017297629 Notice of Acceptance dated Jul. 26, 2018.
AU-2018256628 Examination Report No. 1 dated Jul. 1, 2019.
AU-2019200583 Examination Report No. 1 dated Oct. 17, 2019.
CN201780043946.8 First Office Action of the Chinese Patent Office dated Dec. 22, 2020.
CN201780044006.0 First Office Action of the Chinese Patent Office dated Dec. 16, 2020.
CN201780044008.X First Office Action of the Chinese Patent Office dated Sep. 29, 2020.
EA-201892633 Office Action of the Eurasian Patent Office dated Aug. 10, 2020.
EA-201892634 Office Action of the Eurasian Patent Office dated Mar. 25, 2020.
EA-201892637 Office Action of the Eurasian Patent Office dated Mar. 6, 2020.
EP-17828596.1 European Extended Search Report of European Patent Office dated Mar. 23, 2020.
EP-17828597.9 European Extended Search Report of European Patent Office dated Jul. 20, 2020.
EP-17828613.4 European Extended Search Report of European Patent Office dated Mar. 6, 2020.
EP-17828622.5 European Extended Search Report of European Patent Office dated Mar. 6, 2020.
EP-17828632.4 European Partial Search Report of European Patent Office dated Feb. 10, 2020.
Gerald L., "Size of Letters Required for Visibility as a Function of Viewing Distance and Observer Visual Acuity," U.S. Department of Commerce/National Bureau of Statistics, Jul. 1983.
International Search Report and Written Opinion of PCT/US2017/042276 dated Nov. 24, 2017.
International Preliminary Report on Patentability of PCT/US2017/042418 dated Mar. 25, 2019.
International Search Report and Written Opinion of PCT/US2017/042275 dated Dec. 4, 2017.
International Search Report and Written Opinion of PCT/US2017/042418 dated Dec. 20, 2017.
International Search Report and Written Opinion of PCT/US2017/042452 dated Nov. 17, 2017.
International Search Report and Written Opinion of PCT/US2017/042470 dated Dec. 28, 2017.
NZ-743813 First Examination Report dated Sep. 14, 2018.
NZ-743822 Further Examination Report dated Jun. 11, 2019.
TW-106123879 Office Action of the Taiwan Patent Office dated Oct. 29, 2020.
Wetzstein et al., "On Plenoptic Multiplexing and Reconstruction", International Journal on Computer Vision (IJCV, vol. 101, No. 2, (20130000), pp. 384-400, URL: https://hal.inria.fr/hal-00876493, (Sep. 26, 2017).
EP-17828630.8 European Extended Search Report of European Patent Office dated Mar. 6, 2020.
EP-17828628.2 European Extended Search Report of European Patent Office dated Mar. 6, 2020.
International Search and Written Opinion dated Dec. 28, 2017 of corresponding PCT application No. PCT/US17/42470.
IN201917001780 First Examination Report from the Indian Patent Office dated Aug. 13, 2021.
JP2019-501428 Non-Final Notice of Reasons for Rejection from the Japan Patent Office dated Aug. 3, 2021.
JP2019-501706 Non-Final Notice of Reasons for Rejection from the Japan Patent Office dated Aug. 10, 2021.
JP2019-501554 Non-Final Notice of Reasons for Rejection of the Japan Patent Office dated Jun. 8, 2021.
International Search Report and Written Opinion of PCT/US17/42452 dated Nov. 17, 2017.
International Search Report and Written Opinion of PCT/US17/42275 dated Dec. 4, 2017.
International Search Report and Written Opinion of PCT/US17/42468 dated Nov. 27, 2017.
International Search Report and Written Opinion of PCT/US17/42470 dated Dec. 28, 2017.
International Search Report and Written Opinion of PCT/US17/42418 dated Dec. 20, 2017.
International Search Report and Written Opinion of PCT/US17/42467 dated Dec. 27, 2017.
International Search Report and Written Opinion of PCT/US2017/042466 dated Nov. 28, 2017.
International Search Report and Written Opinion of PCT/US2016/23753 dated Jul. 15, 2016.
KR-10-2019-7004588 Notice of Preliminary Rejection dated Apr. 25, 2022.
JP2019-501531 Non-Final Notice of Reasons for Rejection of the Japan Patent Office dated Sep. 24, 2021.
TW106123878 Office Action of the Taiwan Patent Office dated Nov. 15, 2021.
JP2019-501554 Non-Final Notice of Reasons for Rejection of the Japan Patent Office dated Mar. 29, 2022.
International Search Report and Written Opinion of PCT/US2021/010055 dated May 23, 2022.
JP2019-501554 Final Notice of Reasons for Rejection of the Japan Patent Office dated Dec. 6, 2022.
CN201780043946.8 Second Office Action of the Chinese Patent Office dated Sep. 15, 2021.
Davis et al., "Simulation of Anderson localization in a random fiber using a fast Fresnel diffraction algorithm", Optical Engineering, Soc. of Photo-Optical Instrumentation Engineers, Bellingham, vol. 55, No. 6, Jun. 1, 2016 (Jun. 1, 2016), p. 66122.
EP-17828613.4 European Exam Report of European Patent Office dated Aug. 16, 2021.
Karbasi et al., "Image transport using Anderson localized modes in disordered optical fibers", Proeedings of SPIE, IEEE, US, vol. 8992, Mar. 8, 2014 (Mar. 8, 2014), p. 89920J-89920J.
Mafi et al., "Anderson localisation in fibres", 2014 The European Conference on Optical Communication (ECOC), Systematic Paris Region Systems and ICT Cluster, Sep. 21, 2014 (Sep. 21, 2014), pp. 1-3.
Mafi, "Transverse Anderson localization of light: a tutorial", Advances in Optics and Photonics, vol. 7, No. 3, Sep. 30, 2015 (Sep. 30, 2015), p. 459.
EA-202193101 Notification of the Search Report of the Eurasian Patent Office dated Sep. 16, 2022.
JP2022-067992 Non-Final Notice of Reasons for Rejection from the Japan Patent Office dated Mar. 14, 2023.
Schott, "Technical properties of Fused Imaging Fiber Optics", https://www.schott.comien-gb/products/fused-imaging-fiber-optics-p1000346/technical-details?tab=d85433322c7544949b8da1bc8e593640.
Fifty years of Anderson localization, Ad Lagendijk, Bart van Tiggelen, and Diederik S. Wiersma, Phsyics Today 62(8), 24 (2009). (Year: 2009).

* cited by examiner

SIDE VIEW

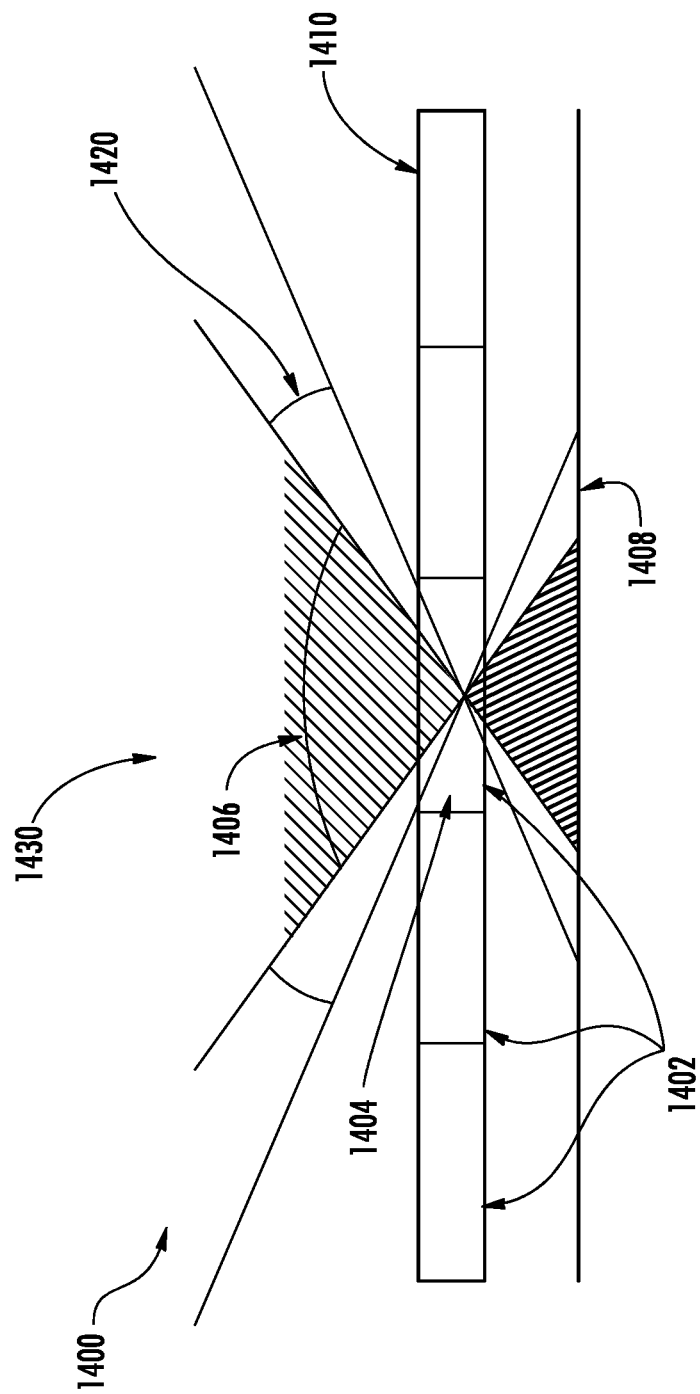

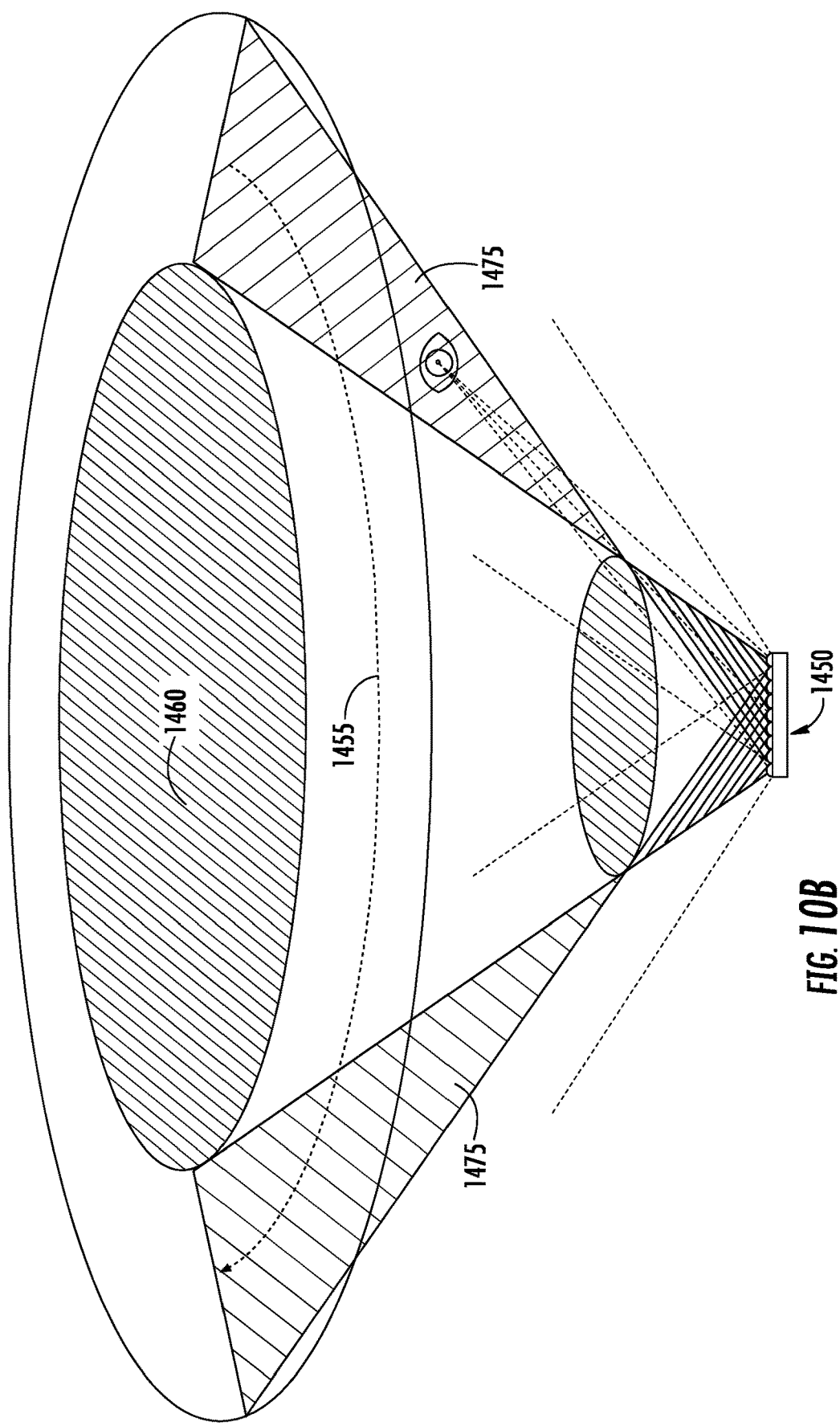

ENERGY RELAY AND TRANSVERSE ANDERSON LOCALIZATION FOR PROPAGATION OF TWO-DIMENSIONAL, LIGHT FIELD AND HOLOGRAPHIC ENERGY

TECHNICAL FIELD

This disclosure generally relates to energy systems, and more specifically, to energy systems configured to direct energy according to a four-dimensional (4D) plenoptic function.

BACKGROUND

The dream of an interactive virtual world within a "holodeck" chamber as popularized by Gene Roddenberry's *Star Trek* and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are energy systems configured to direct energy according to a four-dimensional (4D) plenoptic function.

In one embodiment, an energy system configured to direct energy according to a four-dimensional (4D) plenoptic function, the system having: a plurality of energy devices; an energy relay system having one or more energy relay elements, where each of the one or more energy relay elements comprises a first surface and a second surface, the second surface of the one or more energy relay elements being arranged to form a singular seamless energy surface of the energy relay system, and where a first plurality of energy propagation paths extend from the energy locations in the plurality of energy devices through the singular seamless energy surface of the energy relay system. The energy system further includes an energy waveguide system having an array of energy waveguides, and where a second plurality of energy propagation paths extend from the singular seamless energy surface through the array of energy waveguides in directions determined by a 4D plenoptic function.

In one embodiment, the energy system is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

In another embodiment, the energy system is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

In some embodiments, the one or more relay elements includes fused or tiled mosaics, where any seams between adjacent fused or tiled mosaics are separated by or are less than the minimum perceptible contour as defined by the visual acuity of a human eye having better than 20/40 vision at a distance at or greater than the width or height of the singular seamless energy surface.

In other embodiments, the one or more relay elements includes: optical fiber, silicon, glass, polymer, optical relays, diffractive elements, holographic relay elements, refractive elements, reflective elements, optical face plates, optical combiners, beam splitters, prisms, polarization components, spatial light modulators, active pixels, liquid crystal cells, transparent displays, or any similar materials having Anderson localization or total internal reflection properties for forming the singular seamless energy surface.

In one embodiment, the singular seamless energy surface is operable to guide localized light transmission to within three or less wavelengths of visible light.

In some embodiments, the one or more relay elements are configured to accommodate a shape of the singular seamless energy surface including planar, spherical, cylindrical, conical, faceted, tiled, regular, non-regular, or any other geometric shape for a specified application.

Also disclosed are aggregation systems using the disclosed energy systems herein. In some embodiments, an aggregation system includes a plurality of energy systems similar to those disclosed herein, where the plurality of energy systems are assembled to form a single planar or curved surface to create a seamless aggregate surface oriented in a perpendicular configuration with respect to a floor surface. In other embodiments, an aggregation system includes a plurality of energy systems similar to those disclosed herein, where the plurality of energy systems are assembled to form a single planar or curved surface to create a seamless aggregate surface oriented in a parallel configuration with respect to a floor surface.

In some embodiments, an aggregation system includes a plurality of energy systems similar to those disclosed herein, where the plurality of energy systems are assembled to form two or more planar or curved surfaces to create a seamless aggregate surface across any combination of objects including tables, walls, ceiling, floor or other surfaces. In other embodiments, an aggregation system includes a plurality of energy systems similar to those disclosed herein, where the plurality of energy systems are assembled to form three planar or curved surfaces to create a seamless aggregate surface across three adjacent walls.

In some embodiments, an aggregation system includes a plurality of energy systems similar to those disclosed herein, where the plurality of energy systems are assembled to form four planar or curved surfaces to create a seamless aggregate surface across four enclosed walls. In other embodiments, an aggregation system includes a plurality of energy systems similar to those disclosed herein, where the plurality of energy systems are assembled to form five planar or curved surfaces to create a seamless aggregate surface across any combination of objects including tables, walls, ceiling, floor or other surfaces.

In some embodiments, an aggregation system includes a plurality of energy systems similar to those disclosed herein, where the plurality of energy systems are assembled to form six planar or curved surfaces to create a seamless aggregate surface across four objects including tables, walls, ceiling, floor or other surfaces, in an enclosed environment. In other embodiments, an aggregation system includes a plurality of energy systems similar to those disclosed herein, where the plurality of energy systems are assembled to form a planar or curved surface to create a seamless aggregate cylindrical surface across any range of angles, volumes and combinations of objects including tables, walls, ceiling, floor or other surfaces. In yet some other embodiments, an aggregation system includes a plurality of energy systems similar to those disclosed herein, where the plurality of energy systems are assembled to form a planar or curved surface to create a seamless aggregate spherical or domed surface across any range of angles, volumes and combinations of objects including tables, walls, ceiling, floor or other surfaces.

In one embodiment, the energy system further includes a reflective waveguide element having an aperture to relay converging energy from the singular seamless energy surface to virtual space.

In one embodiment, an energy system configured to direct energy according to a four-dimensional (4D) plenoptic function, the system having: a base structure; a plurality of energy devices coupled to the base structure; an energy relay system coupled to the base structure, the energy relay system having one or more energy relay elements, where each of the one or more energy relay elements comprises a first surface and a second surface, the second surface of the one or more energy relay elements being arranged to form a singular seamless energy surface of the energy relay system, and where a first plurality of energy propagation paths extend from the energy locations in the plurality of energy devices through the singular seamless energy surface of the energy relay system. The energy system further includes an energy waveguide system coupled to the base structure, the energy waveguide having an array of energy waveguides, and where a second plurality of energy propagation paths extend from the singular seamless energy surface through the array of energy waveguides in directions determined by a 4D plenoptic function.

In another embodiment, the energy relay system further includes relay elements including faceplates and optical tapers. In yet another embodiment, the array of energy waveguides is bonded into a single waveguide component. In some embodiments, the energy relay system can be aligned and calibrated to the singular seamless energy surface passively or actively with up to pixel-by-pixel rectification leveraging an external calibration tooling station or alignment hardware.

In one embodiment, the energy waveguide system can be mounted parallel to the base structure. In another embodiment, the singular seamless energy surface can be mounted orthogonal to the base structure.

In some embodiments, the one or more relay elements includes fused or tiled mosaics, where any seams between adjacent fused or tiled mosaics are separated by or are less than the minimum perceptible contour as defined by the visual acuity of a human eye having better than 20/40 vision at a distance at or greater than the width or height of the singular seamless energy surface. In other embodiments, the plurality of energy devices, the energy relay system and the energy waveguide system are coupled to the base structure with one or more mounting brackets.

In some embodiments, the plurality of energy devices include illumination sources emitting image information, and wherein the image information includes emissive, projection, or reflective display technologies, leveraging visible, IR, UV, coherent, laser, infrared, polarized or any other electromagnetic illumination source. In other embodiments, the plurality of energy devices include mechanical energy emitting devices configured to provide immersive audio or volumetric tactile sensation from an acoustic field.

In some embodiments, the plurality of energy devices include energy devices for capturing or sensing energy, including mechanical, chemical, transfer, thermal, electric, potential, kinetic, magnetic, gravitational, radiant, energy, structured, unstructured, or other forms of energy. In other embodiments, the plurality of energy devices include energy devices for propagating or emitting energy, including mechanical, chemical, transfer, thermal, electric, potential, kinetic, magnetic, gravitational, radiant, energy, structured, unstructured, or other forms of energy. In yet some other embodiments, the plurality of energy devices include acoustic receiving devices configured to provide sensory feedback or audible controls.

In operation, the energy system is configured to relay light to form 2D, stereoscopic, multiview, plenoptic, 4D, volumetric, light field, holographic, or any other visual representation of light. In some other operations, the energy system is operable to emit, reflect or converge frequencies to induce tactile sensation or volumetric haptic feedback.

In one embodiment, the array of energy waveguide is designed to project rays up to 360 degrees along a horizontal axis with additional rays in a vertical axis, and limiting rays perpendicular to the singular seamless energy surface. In another embodiment, the energy system is configured for a floor-mounted assembly or a ceiling-mounted assembly, and optionally includes a transparent surface above the floor-mounted assembly.

In one embodiment, the energy system is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

In another embodiment, the energy system is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

In one embodiment, an energy system configured to direct energy according to a four-dimensional (4D) plenoptic function includes a plurality of energy devices; an energy relay system having one or more energy relay elements, where each of the one or more energy relay elements includes a first surface and a second surface, the second surface of the one or more energy relay elements being arranged to form a singular seamless energy surface of the energy relay system, and where a first plurality of energy propagation paths extend from the energy locations in the plurality of energy devices through the singular seamless energy surface of the energy relay system. The energy system further includes an energy waveguide system having an array of energy waveguides, where a second plurality of energy propagation paths extend from the singular seamless energy surface through the array of energy waveguides in directions determined by a 4D plenoptic function. In one embodiment, the singular seamless energy surface is operable to both provide and receive energy therethrough.

In one embodiment, the energy system is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

In another embodiment, the energy system is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

In some embodiments, the energy system is configured to sense relative depth, proximity, images, color, sound and other electromagnetic frequencies, and where the sensed energy is processed to perform machine vision related to 4D eye and retinal tracking. In other embodiments, the singular seamless energy surface is further operable to both display and capture simultaneously from the singular seamless energy surface with the energy waveguide system designed such that light field data are projected by the plurality of energy devices through the energy waveguide system and simultaneously received through the same singular seamless energy surface.

These and other advantages of the present disclosure will become apparent to those skilled in the art from the following detailed description and the appended claims.

BRIEF DESCRIPTION OF THE DRAWINGS

FIG. 10A illustrates a waveguide element exhibiting a non-regular distribution of energy, in accordance with one embodiment of the present disclosure;

FIG. 10B illustrates an orthogonal view of a table-mounted energy waveguide system, in accordance with one embodiment of the present disclosure;

DETAILED DESCRIPTION

Figure 1:
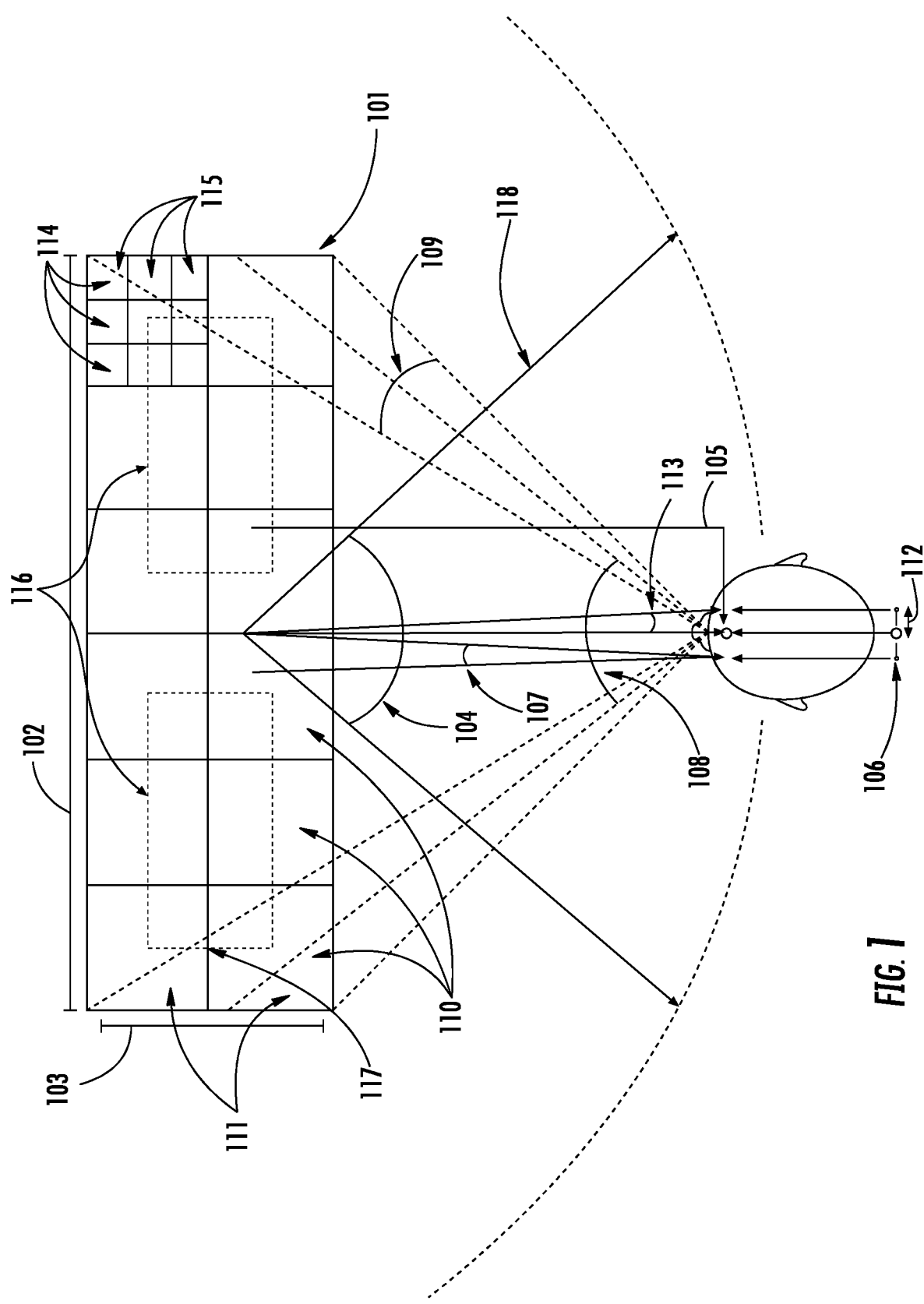
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of energy and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and energy device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width }(W)}{\text{Height }(H)}$$

$$\text{Surface Horizontal Size} = \text{Surface Diagonal} * \left(\frac{1}{\sqrt{1 + \left(\frac{H}{W}\right)^2}}\right)$$

$$\text{Surface Vertical Size} = \text{Surface Diagonal} * \left(\frac{1}{\sqrt{1 + \left(\frac{W}{H}\right)^2}}\right)$$

-continued $$\text{Horizontal Field of View} = 2 * a\tan\left(\frac{\text{Surface Horizontal Size}}{2 * \text{Seating Distance}}\right)$$

$$\text{Vertical Field of View} = 2 * a\tan\left(\frac{\text{Surface Vertical Size}}{2 * \text{Seating Distance}}\right)$$

$$\text{Horizontal Element Resolution} = \text{Horizontal } FoV * \frac{60}{\text{Eye Resolution}}$$

$$\text{Vertical Element Resolution} = \text{Vertical } FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Ocular Distance}}{(\text{Number of Desired intermediate Samples} + 1)}$$

$$\text{Angular Sampling} = a\tan\left(\frac{\text{Sample Distance}}{\text{Seating Distance}}\right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element}(N) = \frac{\text{Seating }FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
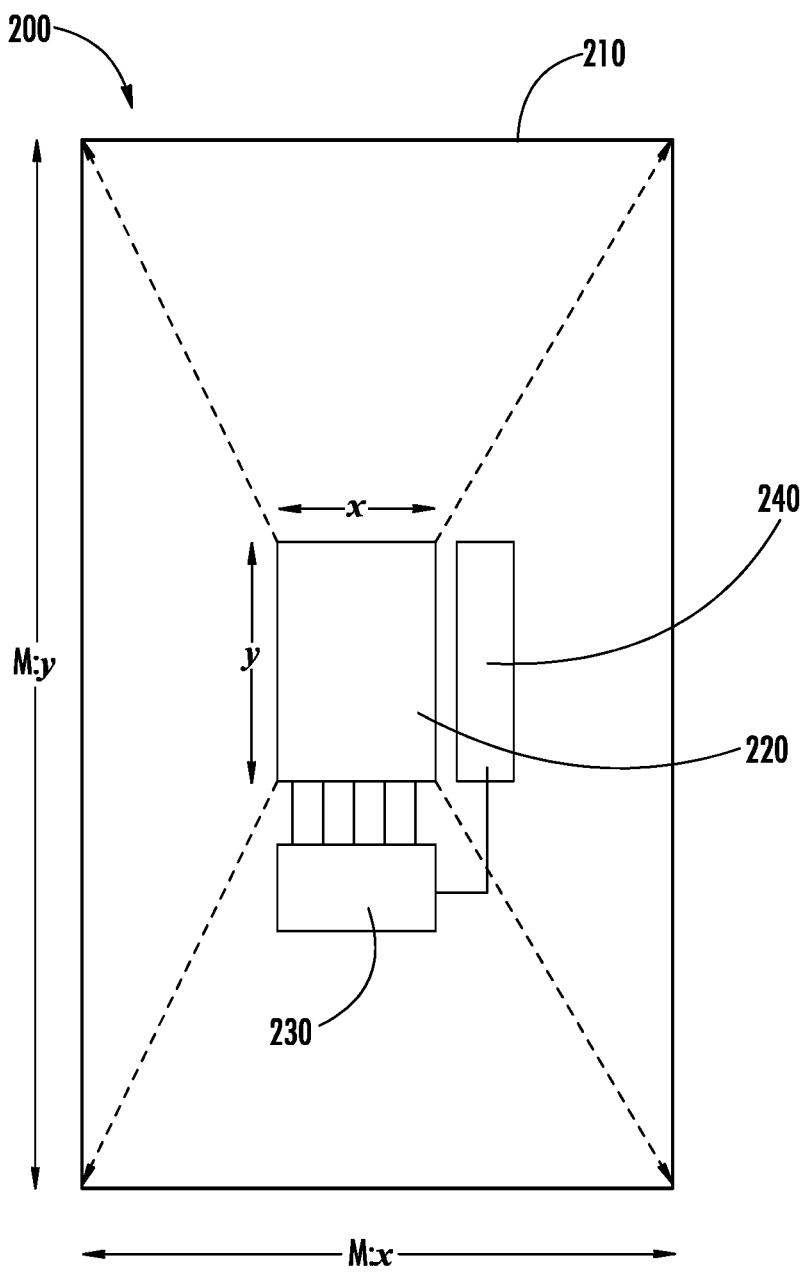
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices consist of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
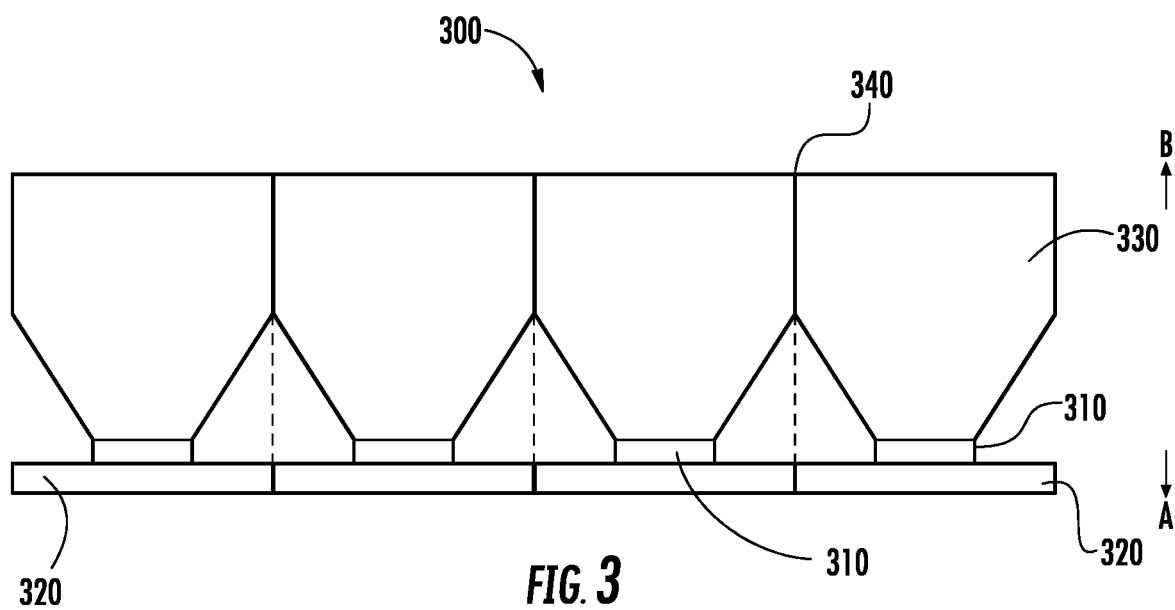
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
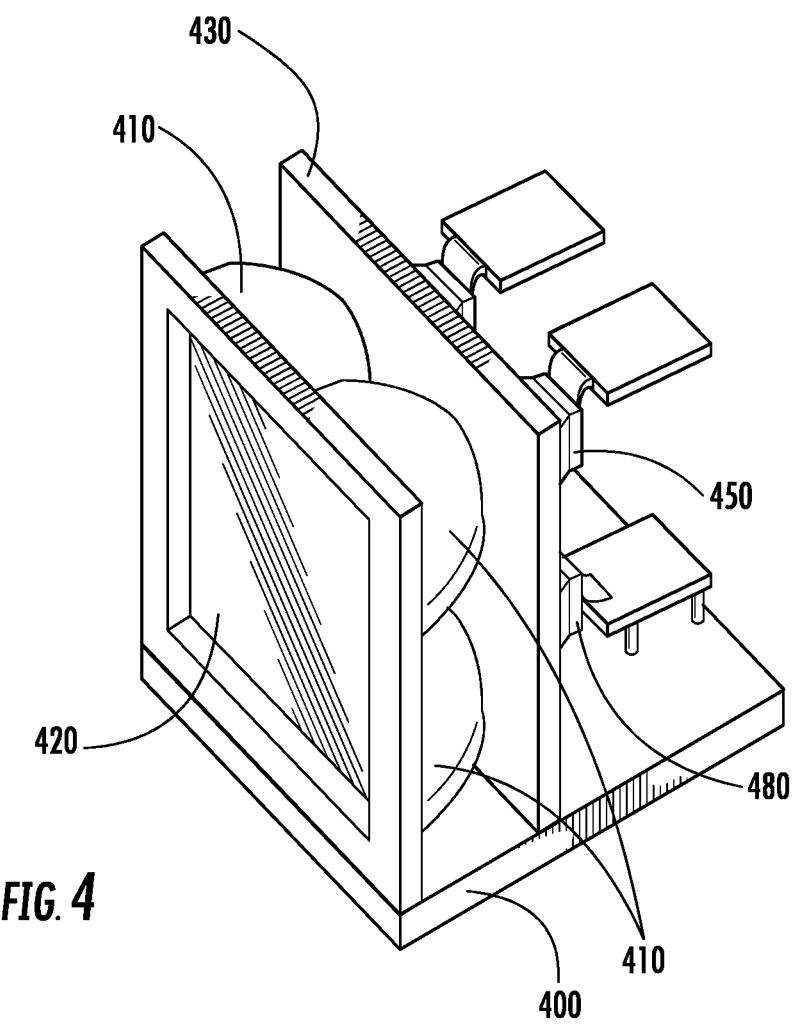
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless energy surface directing energy along propagation paths extending between one or more energy locations and the seamless energy surface, and where the separation between the edges of any two adjacent second sides of the terminal energy relay elements is less than the minimum perceptible contour as defined by the visual acuity of a human eye having better than 20/40 vision at a distance greater than the width of the singular seamless energy surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10 degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figure 5A:
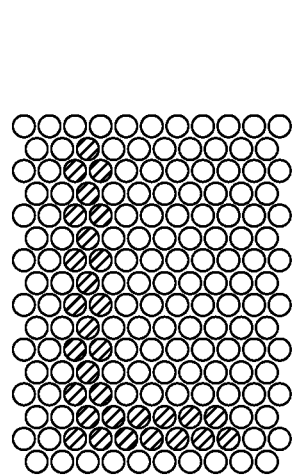
FIG. 5A is a schematic diagram illustrating an example of a relayed image through multi-core optical fibers.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

Figure 5B:
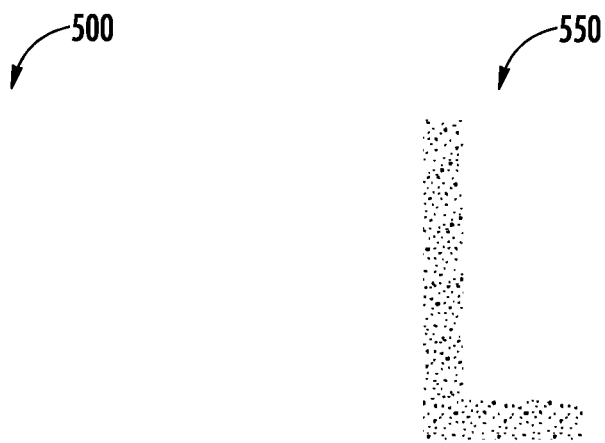
FIG. 5B is a schematic diagram illustrating an example of a relayed image through an optical relay that exhibits the properties of the Transverse Anderson Localization principle.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein localized energy waves propagating through the energy relay have higher transport efficiency in the longitudinal orientation versus the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bi-directional energy propagation throughout the system.

In an embodiment, the Transverse Anderson Localization energy relays are configured as loose coherent or flexible energy relay elements.

Considerations for 4D Plenoptic Functions

Selective Propagation of Energy through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
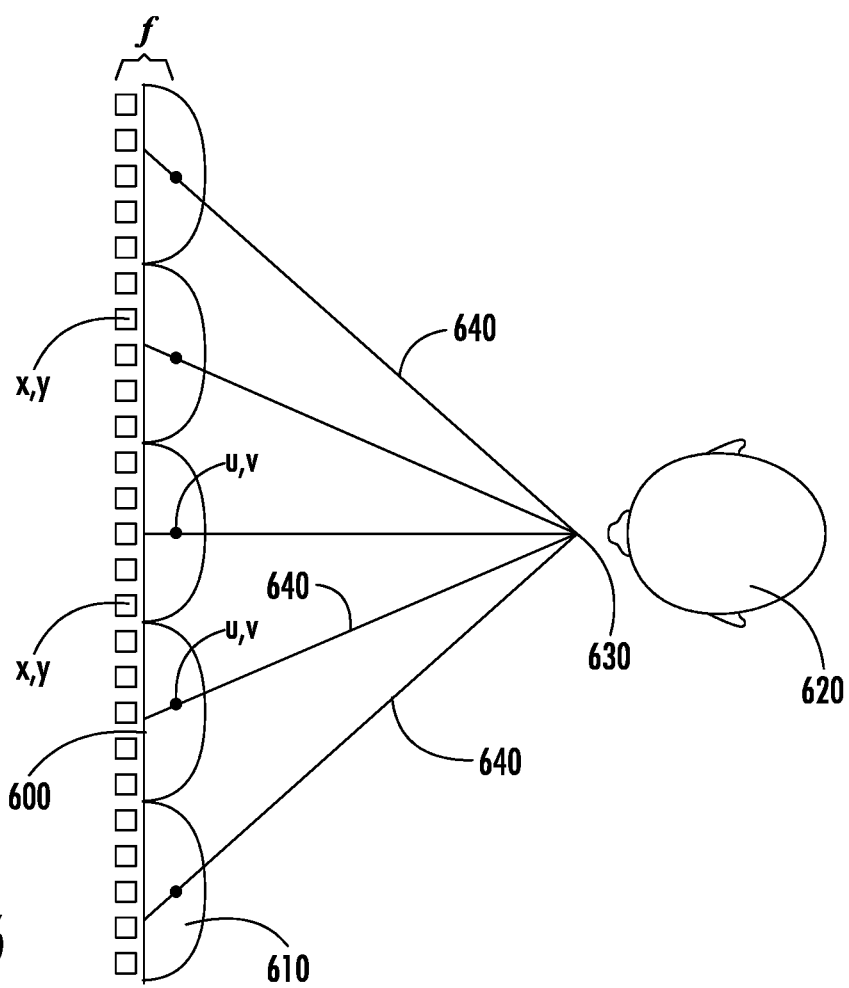
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general, and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bi-Directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy systems is aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregates tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bi-directional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible energy display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bi-directional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Figure 7A:
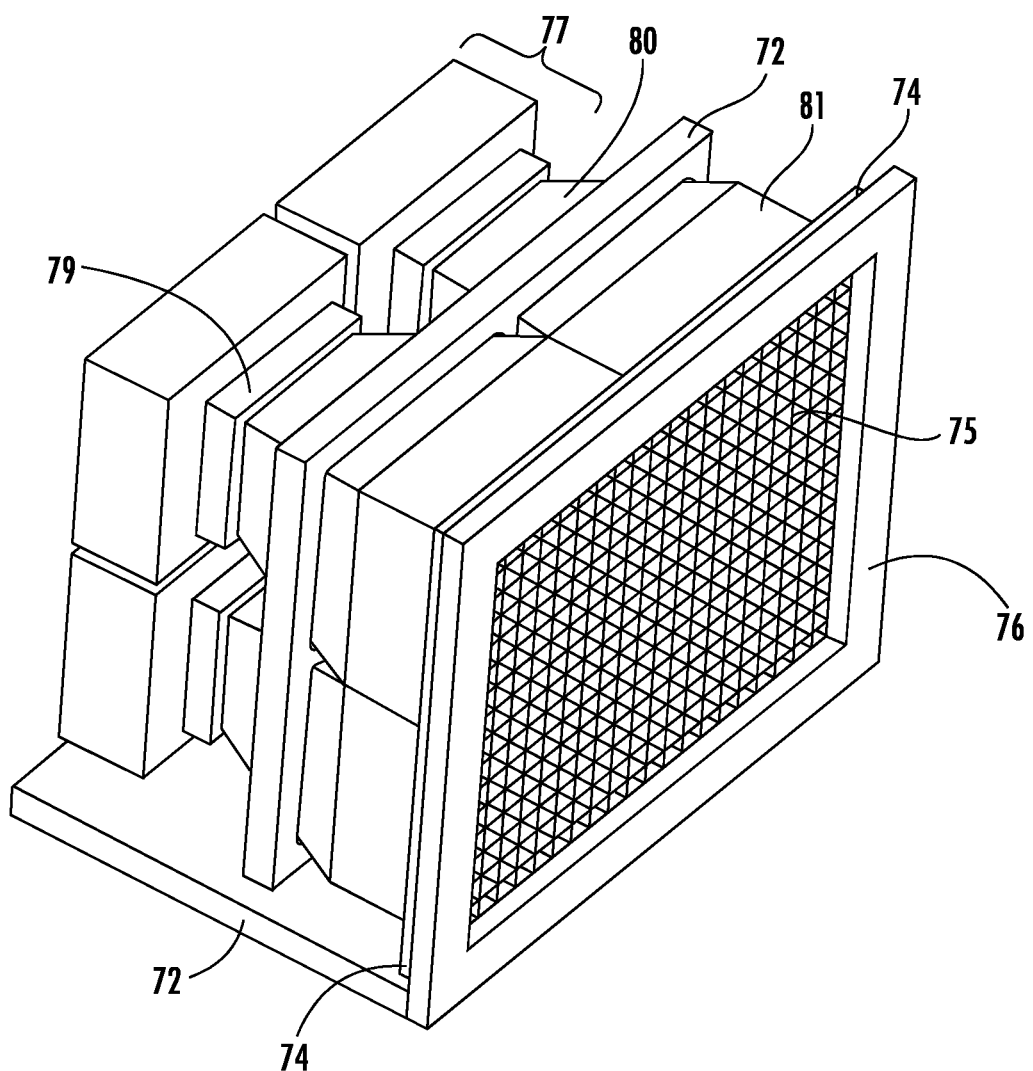
FIG. 7A illustrates a perspective view of an energy waveguide system having a base structure, four energy devices, and four energy relay elements forming a seamless energy surface, in accordance with one embodiment of the present disclosure.

Configurations for Bi-Directional Seamless Energy Surfaces to Propagate Two-Dimensional, Light Field and Holographic Energy FIG. 7A illustrates a perspective view of energy system having a base structure 72 and four energy relays 81, in accordance with one embodiment of the present disclosure. The base structure 72 is configured to hold each of the exemplary energy relay elements 81, where each energy relay elements 81 can be adhered together forming a seamless energy surface 74, and the seamless energy surface 74 is fastened to the base structure 72.

In an embodiment, the energy system includes a base structure 72, one or more components collectively forming a seamless energy surface 74, one or more energy devices 77, and one or more energy waveguides 75. The energy surface 74, the energy devices 77, and the energy relays 81 may be mounted to the base structure 72, and the energy system may be operable of at least one of emitting or receiving energy through the energy surface 74.

In an embodiment, the base structure 72 may be an optical taper base structure positioned in a vertical orientation. The seamless energy surface 74 may have an energy waveguide 75 and an energy waveguide frame 76 positioned in front of the base structure 72. In an embodiment, the energy waveguide 75 may be a holographic lens array (HLA). In an embodiment, the energy waveguide frame 76 may frame one or more sides of the HLA 75. The energy devices 77 may comprise one or more emissive displays 79, one or more optical relay faceplates, and one or more device electronics positioned behind the base structure 72. The energy relay elements 81 may comprise one or more optical relay tapers positioned between the base structure 72 and the energy surface 74. An energy relay element 80 may include a first surface behind the energy relay element 81 and two or more second surfaces in front of two or more energy devices 79. In an embodiment, the two or more surfaces of relay element 80 are attached to multiple devices 79, the devices comprise both an energy emitting device and an energy sensing device. In another embodiment, the multiple devices 79 may comprise a display and an imaging sensor. In another embodiment, the multiple devices 79 may comprise an array of ultrasonic emitting devices and a display device.

To fabricate a seamless energy surface 74, it may be necessary to mechanically align and fuse or bond the energy relay elements into a mosaic and all elements such that the total deviation from the point of manufacturer through use is less than a predetermined tolerance. This tolerance is dependent upon the product line and environmental conditions that the display is intended, to include temperature (CTE changes), shock tolerance, other environmental factors and the like. In one such embodiment, the tolerance between any display pixel and the resultant energy surface may be less than 0.5-pixel max deviation. In another embodiment, this tolerance may be less than 1 um.

The elements that have consistent CTE and/or response to the changes in operating conditions include the material leveraged to hold the seamless energy surface, the energy relay material (including epoxies, polymer(s), core, clad, and the like that are used to create the resultant energy relays), the seamless energy surface, the energy waveguides, and any other mechanical structure that is leveraged to fabricate the final assembly. As such, it is recommended to leverage a material with a CTE that closely matches the relay materials. In one embodiment, Kovar may be leveraged for the mechanical structure with glass optical relays. In another embodiment, acrylic may be leveraged for the mechanical structure with polymer optical relays that exhibit transverse Anderson localization.

Structurally it may be advantageous to host each of the energy relay elements with a base structure that has sufficiently matched CTE and structural rigidity to maintain the alignment of the seamless energy surface for the specified application. The structure may include a grid of openings with a diameter at least of the diameter of the energy relay elements at the position of insertion that may be beveled, curved, or any other shape to appropriately hold the relay element. Additional mounting brackets may be installed to the base structure such that additional reinforcement may be provided to adequately secure each element. The mounting brackets may be screwed to the base structure and may be adhered or pressure fit or the like to the relay elements. The mounting brackets may hold one or more relay elements and may host one or more per relay element. The relay elements may further be adhered or pressure fit or the like to the base structure. Each relay element may be fused, bonded, adhered, pressure fit, aligned or otherwise together to form the resultant seamless energy surface. A device may be mounted to the rear of the relay element and aligned passively or actively wherein data feedback through an imaging source, microscope, other optics, human vision, acoustic device, sound pressure device, other energy sensor, or the like in order to ensure appropriate energy coordinate alignment within the determined tolerance is maintained. The device may be mounted with refractive index matching oils, epoxy, bonding agents, mechanical pressure, or the like.

FIG. 7A illustrates one such embodiment wherein the base structure 72 holds each of the exemplary four energy relay elements 81, each relay element is bonded together, and a series of mounting brackets per relay element 81 are screwed to the base structure 72 and adhered to the respective relay element. The base structure 72 can also support the four energy relay elements 81 by enclosing them around all or part of their perimeter after they have been bonded together.

Mechanical considerations of the assembly may comprise (i) the one or more components for forming the energy surface, and the one or more energy devices are bonded to relay elements including faceplates and optical tapers; (ii) the one or more elements for forming the waveguide are bonded into a single waveguide component; (iii) the one or more energy devices are aligned and calibrated to the energy surface and/or the waveguide passively or actively with up to pixel-by-pixel rectification leveraging the an external calibration tooling station or alignment hardware; (vi) the waveguide is mounted orthogonal to the base structure; or (vii) the waveguide is constructed such that seams between adjacent elements are separated by or less than the minimum perceptible contour as defined by the visual acuity of a human eye having better than 20/40 vision at a distance at or greater than the energy surface height or width perpendicular away from the energy surface.

The one or more energy devices may include: (i) illumination sources emitting image information, and wherein the image information includes emissive, projection, or reflective display technologies, leveraging visible, IR, UV, coherent, laser, infrared, polarized or any other energy illumination source; (ii) audible, ultrasonic, or other acoustic emitting devices provide immersive audio or volumetric tactile sensation from an acoustic field integrated directly into the system; (iii) sensors for capturing or recording any energy in the energy spectrum, including structured, coherent, collimated, visible light, IR, UV, microwaves, radio waves, or other forms of energy radiation; or (iv) acoustic receiving devices configured to provide sensory feedback or audible controls over an interactive light field system.

In an embodiment, the optomechanical display device may be capable of emitting and guiding light to form 2D, stereoscopic, multiview, plenoptic, 4D, volumetric, light field, holographic, or any other visual representation of light.

FIG. 7A is an example of a light field optomechanical system if configured with emissive display devices, optical relays, and a waveguide that is realized as an array of refractive elements such as an HLA, where a visible image from one or more displays may be optically relayed before being transmitted to the energy surface, where the array of refractive elements provides a mapping between each location on the energy surface and the direction of projection of the light from that location, such that a 4D volumetric light field image may be projected.

In an embodiment, the waveguide may be operable to converge rays of light to induce both vergence and accommodation from an observer point of view.

In an embodiment, the waveguides and energy relays may be formed or polished with various surface geometries. In an embodiment, the energy relays include elements that induce transverse Anderson localization. In an embodiment, the energy relays are bidirectional and may both emit and/or project energy.

In one embodiment, an energy system configured to direct energy according to a four-dimensional (4D) plenoptic function includes a plurality of energy devices. In some embodiments, the plurality of energy devices include illumination sources emitting image information, where the image information includes emissive, projection, or reflective display technologies, leveraging visible, IR, UV, coherent, laser, infrared, polarized or any other electromagnetic illumination source. In other embodiments, the plurality of energy devices include mechanical energy emitting devices configured to provide immersive audio or volumetric tactile sensation from an acoustic field.

In some embodiments, the energy system as configured above may further include a base structure (e.g., 72) such that the plurality of energy devices, the energy relay system, and the energy waveguide system may all be coupled to the base structure. In other embodiments, the plurality of energy devices, the energy relay system and the energy waveguide system may be coupled to the base structure with one or more mounting brackets.

Figure 7B:
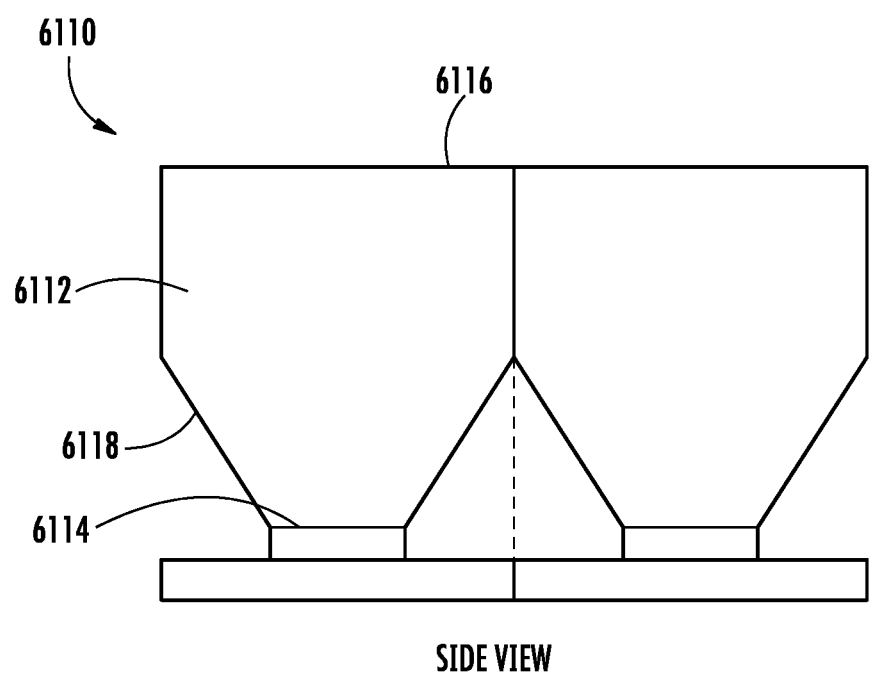
FIG. 7B illustrates an energy relay system according to one embodiment of the present disclosure.

In some embodiments, the plurality of energy devices include energy devices for capturing or sensing energy, including mechanical, chemical, transfer, thermal, electric, potential, kinetic, magnetic, gravitational, radiant, energy, structured, unstructured, or other forms of energy. In other embodiments, the plurality of energy devices include energy devices for propagating or emitting energy, including mechanical, chemical, transfer, thermal, electric, potential, kinetic, magnetic, gravitational, radiant, energy, structured, unstructured, or other forms of energy. In yet other embodiments, the plurality of energy devices include acoustic receiving devices configured to provide sensory feedback or audible controls In one embodiment, the energy system further includes an energy relay system (e.g., 6110 as best shown in FIG. 7B) having one or more energy relay elements, where each of the one or more energy relay elements includes a first surface and a second surface, the second surface of the one or more energy relay elements being arranged to form a singular seamless energy surface of the energy relay system, and where a first plurality of energy propagation paths extend from the energy locations in the plurality of energy devices through the singular seamless energy surface of the energy relay system. This will be discussed in more detail below.

Reference is now made to FIG. 7B illustrating an energy relay system 6110, in an orthogonal view in accordance with one embodiment of the present disclosure. In one embodiment, the energy relay system 6110 may include two or more relay elements 6112, each relay element 6112 formed of one or more structures, each relay element 6112 having a first surface 6114, a second surface 6116, a transverse orientation (generally parallel to the surfaces 6114, 6116) and a longitudinal orientation (generally perpendicular to the surfaces 6114, 6116). In one embodiment, the surface area of the first surface 6114 may be different than the surface area of the second surface 6116. For example, the surface area of the first surface 6114 may be greater or lesser than the surface area of the second surface 6116. In another embodiment, the surface area of the first surface 114 may be the same as the surface area of the second surface 6116. Energy waves can pass from the first surface 6114 to the second surface 6116, or vice versa.

In one embodiment, the relay element 6112 of the energy relay system 6110 includes a sloped profile portion 6118 between the first surface 6114 and the second surface 6116. In operation, energy waves propagating between the first surface 6114 and the second surface 6116 may have a higher transport efficiency in the longitudinal orientation than in the transverse orientation, and energy waves passing through the relay element 6112 may result in spatial magnification or spatial de-magnification. In other words, energy waves passing through the relay element 6112 of the relay element device 6110 may experience increased magnification or decreased magnification. In some embodiments, the one or more structures for forming the energy relay element 6110 may include glass, carbon, optical fiber, optical film, plastic, polymer, or mixtures thereof.

In one embodiment, the energy waves passing through the first surface 6114 has a first resolution, while the energy waves passing through the second surface 6116 has a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In some embodiments, the first surface 6114 may be configured to receive energy from an energy wave source, the energy wave source including a mechanical envelope having a width different than the width of at least one of the first surface 6114 and the second surface 6116.

In each relay 6112, energy is transported between first and second surfaces which defines the longitudinal orientation, the first and second surfaces of each of the relays extends generally along a transverse orientation defined by the first and second directions, where the longitudinal orientation is substantially normal to the transverse orientation. In one embodiment, energy waves propagating through the plurality of relays have higher transport efficiency in the longitudinal orientation than in the transverse orientation due to randomized refractive index variability in the transverse orientation coupled with minimal refractive index variation in the longitudinal orientation. In some embodiments where each relay is constructed of multicore fiber, the energy waves propagating within each relay element may travel in the longitudinal orientation determined by the alignment of fibers in this orientation.

In an embodiment, a separation between the edges of any two adjacent second sides of the terminal energy relay elements may be less than a minimum perceptible contour as defined by the visual acuity of a human eye having better than 20/40 vision at a distance from the seamless energy surface that is greater than the lesser of a height of the singular seamless energy surface or a width of the singular seamless energy surface.

In one embodiment, the plurality of energy relay elements in the stacked configuration may include a plurality of faceplates. In some embodiments, the plurality of faceplates may have different lengths or are loose coherent optical relays. In other embodiments, the plurality of elements may have sloped profile portions similar to that of FIG. 7B, where the sloped profile portions may be angled, linear, curved, tapered, faceted or aligned at a non-perpendicular angle relative to a normal axis of the relay element. In yet another embodiment, energy waves propagating through the plurality of relay elements have higher transport efficiency in the longitudinal orientation than in the transverse orientation due to randomized refractive index variability in the transverse orientation coupled with minimal refractive index variation in the longitudinal orientation. In embodiments where each energy relay is constructed of multicore fiber, the energy waves propagating within each relay element may travel in the longitudinal orientation determined by the alignment of fibers in this orientation.

In some embodiments, the one or more relay elements (e.g., 6112) includes fused or tiled mosaics, where any seams between adjacent fused or tiled mosaics are separated by or are less than the minimum perceptible contour as defined by the visual acuity of a human eye having better than 20/40 vision at a distance at or greater than the width or height of the singular seamless energy surface.

In other embodiments, the one or more relay elements (e.g., 6112) includes: optical fiber, silicon, glass, polymer, optical relays, diffractive elements, holographic relay elements, refractive elements, reflective elements, optical face plates, optical combiners, beam splitters, prisms, polarization components, spatial light modulators, active pixels, liquid crystal cells, transparent displays, or any similar materials having Anderson localization or total internal reflection properties for forming the singular seamless energy surface.

In yet other embodiments, the one or more relay elements (e.g., 6112) are configured to accommodate a shape of the singular seamless energy surface including planar, spherical, cylindrical, conical, faceted, tiled, regular, non-regular, or any other geometric shape for a specified application.

In another embodiment, the system further includes an energy waveguide system (e.g., 7100 as best shown in FIGS. 7C-7L) having an array of energy waveguides, where a second plurality of energy propagation paths extend from the singular seamless energy surface through the array of energy waveguides in directions determined by a 4D plenoptic function.

Figure 7C:
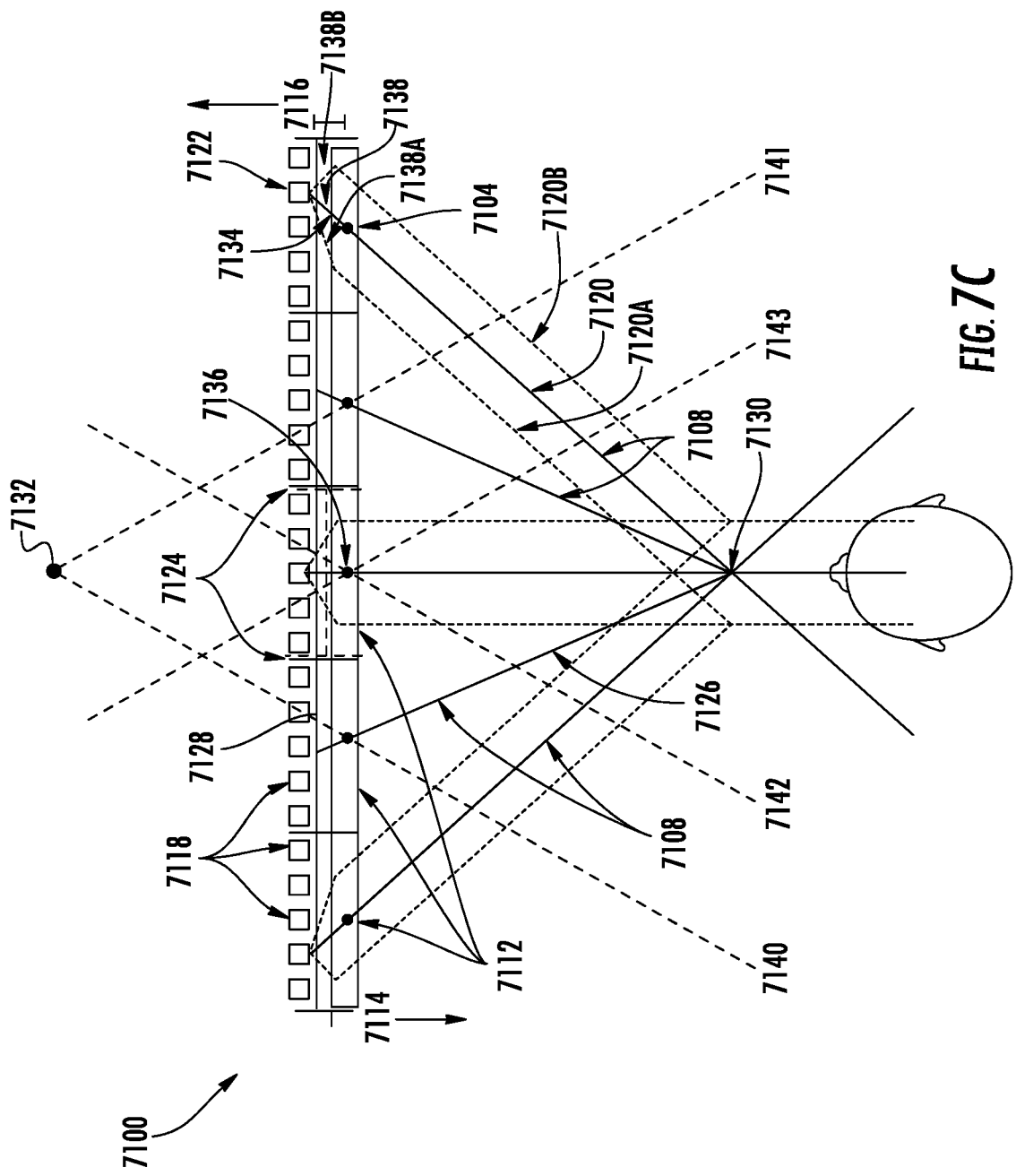
FIG. 7C illustrates a top-down perspective view of an embodiment of an energy waveguide system according to one embodiment of the present disclosure.

FIG. 7C illustrates a top-down perspective view of an embodiment of an energy waveguide system 7100 operable to define a plurality of energy propagation paths 7108. Energy waveguide system 7100 comprises an array of energy waveguides 7112 configured to direct energy therethrough along the plurality of energy propagation paths 7108. In an embodiment, the plurality of energy propagation paths 7108 extend through a plurality of energy locations 7118 on a first side of the array 7116 to a second side of the array 7114.

Figure 7D:
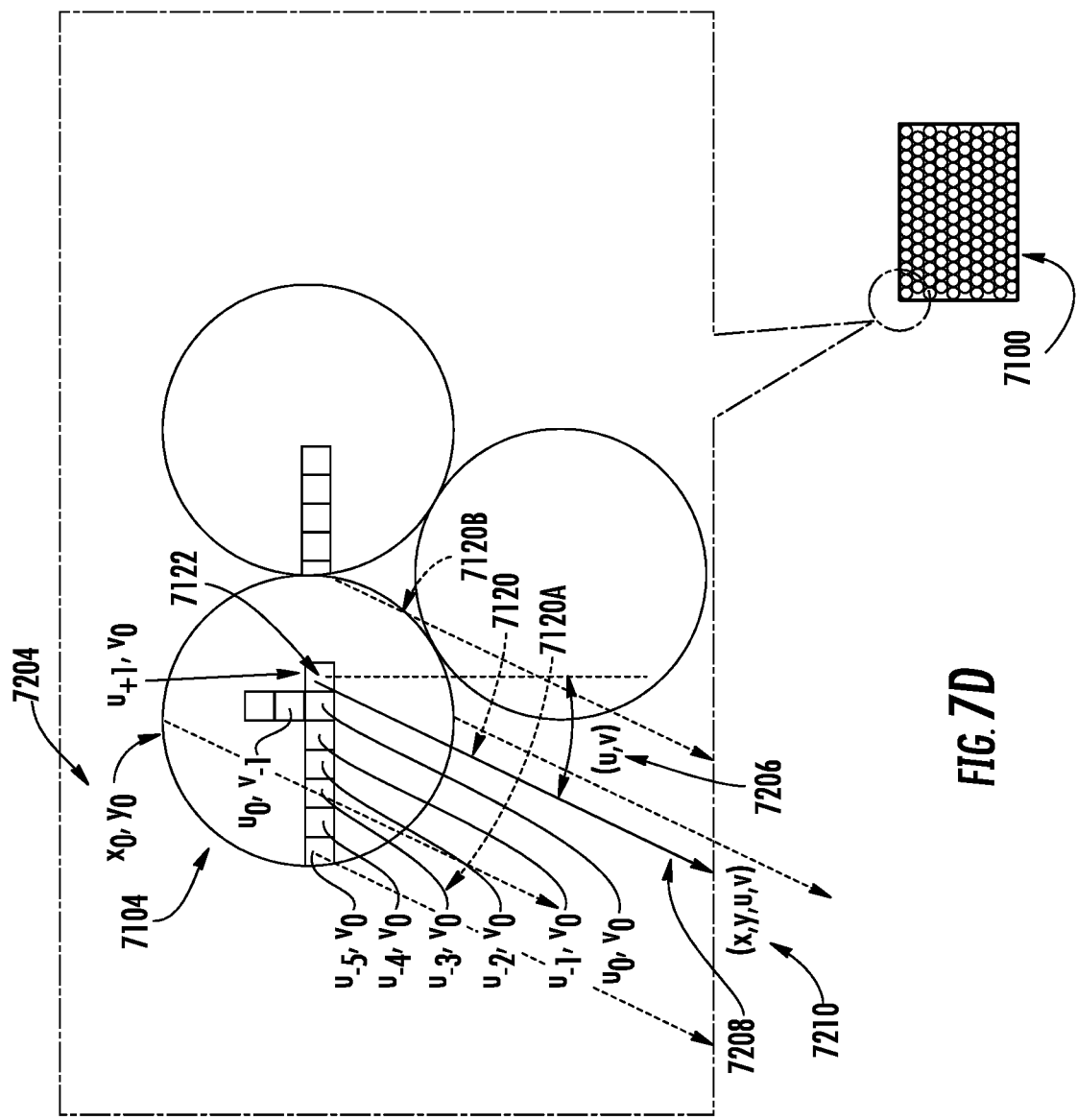
FIG. 7D illustrates a front perspective view of the embodiment shown in FIG. 7C.
Figure 7E:
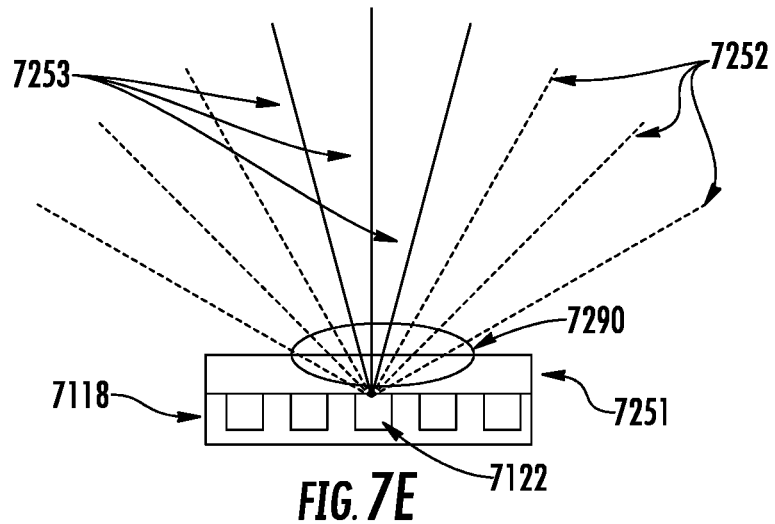
FIGS. 7E-7L illustrate various embodiments of an energy inhibiting element.
Figure 7F:
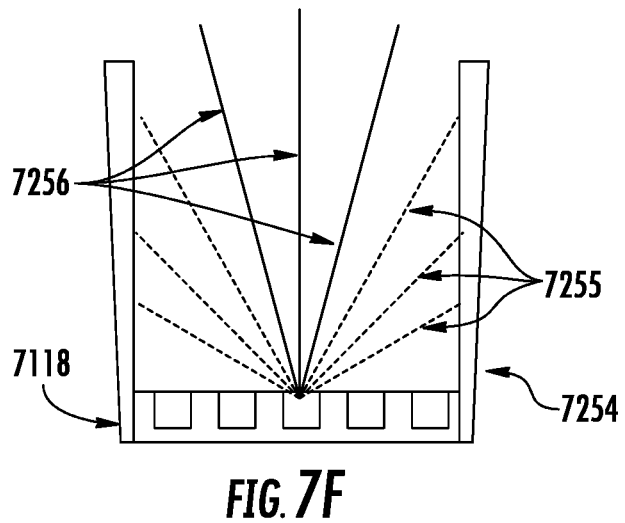
Figure 7G:
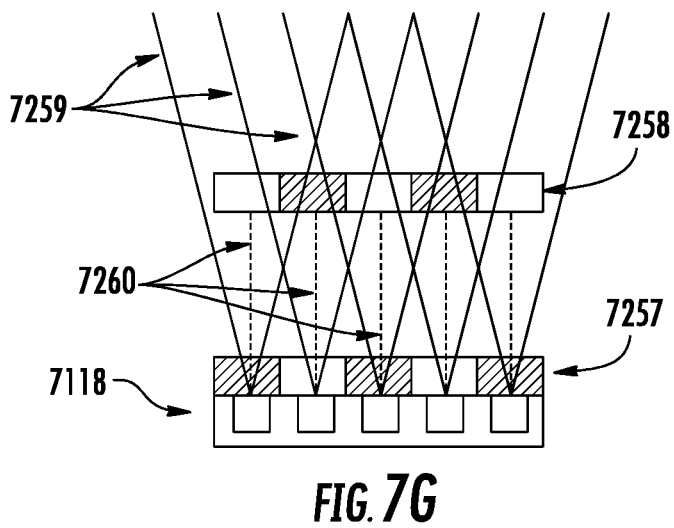
Figure 7H:
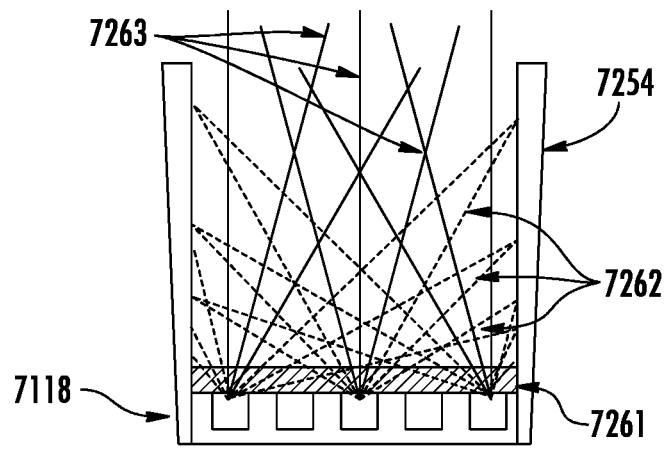
Figure 7I:
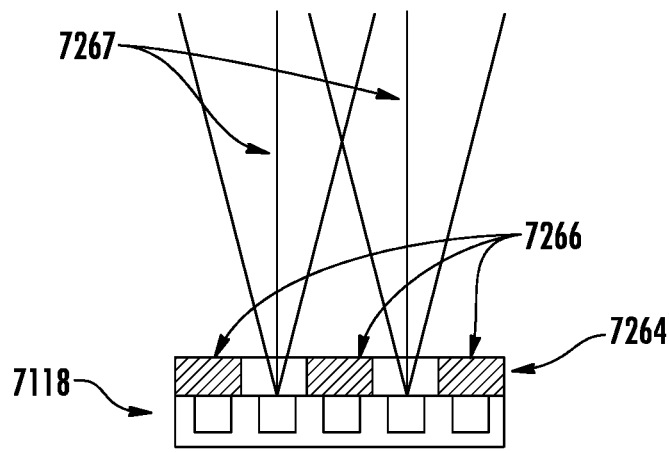
Figure 7J:
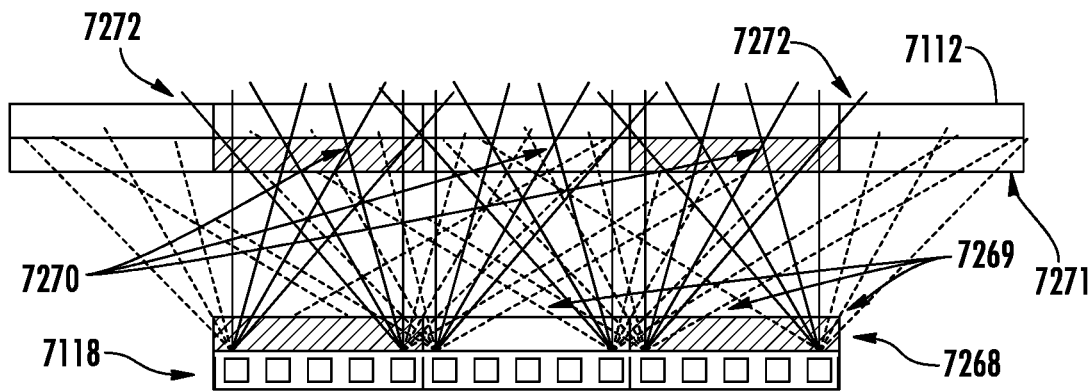
Figure 7K:
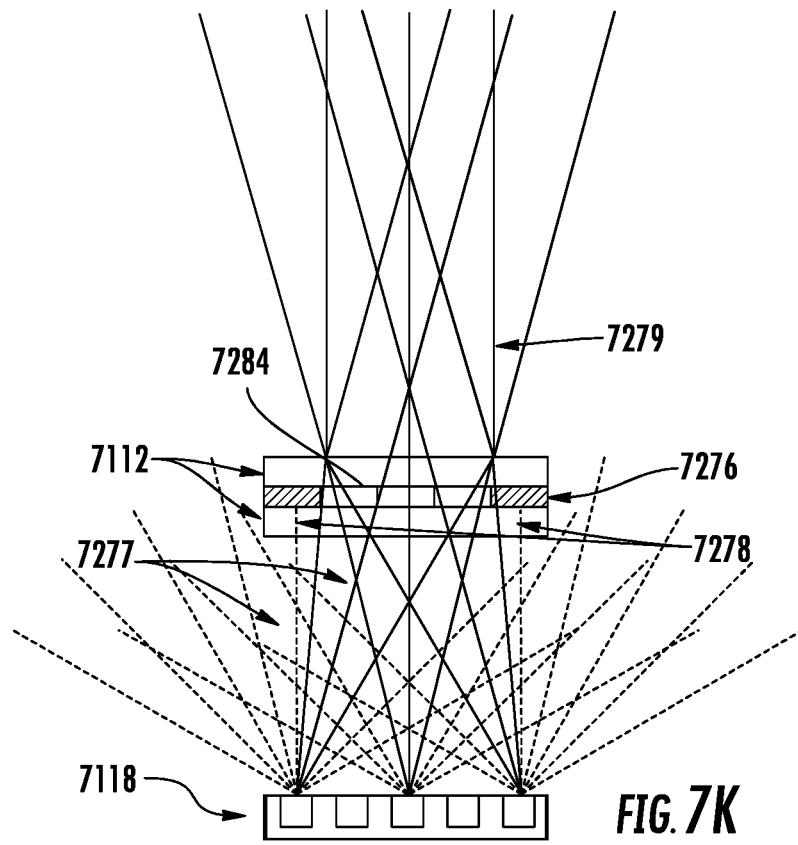
Figure 7L:
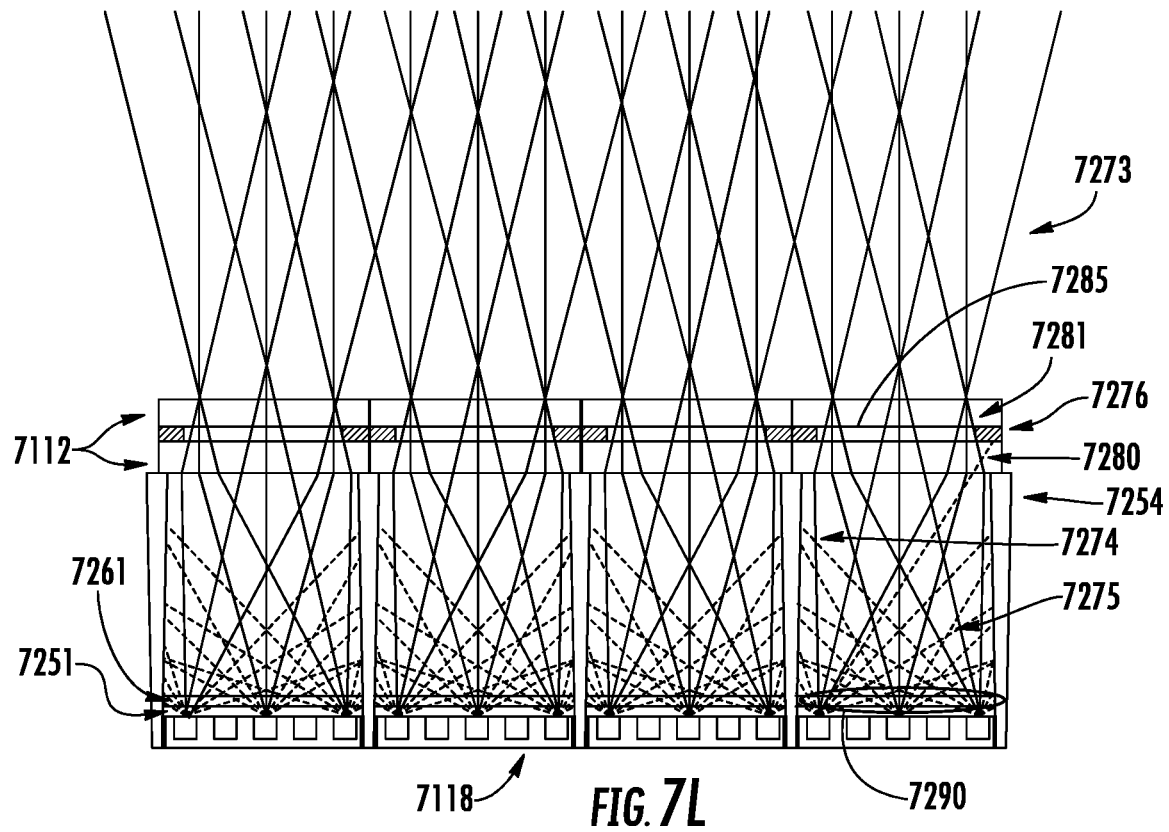

Referring to FIGS. 7C and 7L, in an embodiment, a first subset 7290 of the plurality of energy propagation paths 7108 extend through a first energy location 7122. The first energy waveguide 7104 is configured to direct energy along a first energy propagation path 7120 of the first subset 7290 of the plurality of energy propagation paths 7108. The first energy propagation path 7120 may be defined by a first chief ray 7138 formed between the first energy location 7122 and the first energy waveguide 7104. The first energy propagation path 7120 may comprise rays 7138A and 7138B, formed between the first energy location 7122 and the first energy waveguide 7104, which are directed by first energy waveguide 7104 along energy propagation paths 7120A and 7120B, respectively. The first energy propagation path 7120 may extend from the first energy waveguide 7104 towards the second side of the array 7114. In an embodiment, energy directed along the first energy propagation path 7120 comprises one or more energy propagation paths between or including energy propagation paths 7120A and 7120B, which are directed through the first energy waveguide 7104 in a direction that is substantially parallel to the angle propagated through the second side 7114 by the first chief ray 7138.

Embodiments may be configured such that energy directed along the first energy propagation path 7120 may exit the first energy waveguide 7104 in a direction that is substantially parallel to energy propagation paths 7120A and 7120B and to the first chief ray 7138. It may be assumed that an energy propagation path extending through an energy waveguide element 7112 on the second side 7114 comprises a plurality of energy propagation paths of a substantially similar propagation direction.

FIG. 7D is a front view illustration of an embodiment of energy waveguide system 7100. The first energy propagation path 7120 may extend towards the second side of the array 7114 in a unique direction 7208 extending from the first energy waveguide 7104, which is determined at least by the first energy location 7122. The first energy waveguide 7104 may be defined by a spatial coordinate 7204, and the unique direction 7208 which is determined at least by first energy location 7122 may be defined by an angular coordinate 7206 defining the directions of the first energy propagation path 7120. The spatial coordinate 7204 and the angular coordinate 7206 may form a four-dimensional plenoptic coordinate set 7210 which defines the unique direction 7208 of the first energy propagation path 7120.

In an embodiment, energy directed along the first energy propagation path 7120 through the first energy waveguide 7104 substantially fills a first aperture 7134 of the first energy waveguide 7104, and propagates along one or more energy propagation paths which lie between energy propagation paths 7120A and 7120B and are parallel to the direction of the first energy propagation path 7120. In an embodiment, the one or more energy propagation paths that substantially fill the first aperture 7134 may comprise greater than 50% of the first aperture 7134 diameter.

In a preferred embodiment, energy directed along the first energy propagation path 7120 through the first energy waveguide 7104 which substantially fills the first aperture 7134 may comprise between 50% to 80% of the first aperture 7134 diameter.

Turning back to FIGS. 7C and 7E-7L, in an embodiment, the energy waveguide system 7100 may further comprise an energy inhibiting element 7124 positioned to limit propagation of energy between the first side 7116 and the second side 7114 and to inhibit energy propagation between adjacent waveguides 7112. In an embodiment, the energy inhibiting element is configured to inhibit energy propagation along a portion of the first subset 7290 of the plurality of energy propagation paths 7108 that do not extend through the first aperture 7134. In an embodiment, the energy inhibiting element 7124 may be located on the first side 7116 between the array of energy waveguides 7112 and the plurality of energy locations 7118. In an embodiment, the energy inhibiting element 7124 may be located on the second side 7114 between the plurality of energy locations 7118 and the energy propagation paths 7108. In an embodiment, the energy inhibiting element 7124 may be located on the first side 7116 or the second side 7114 orthogonal to the array of energy waveguides 7112 or the plurality of energy locations 7118.

In an embodiment, energy directed along the first energy propagation path 7120 may converge with energy directed along a second energy propagation path 7126 through a second energy waveguide 7128. The first and second energy propagation paths may converge at a location 7130 on the second side 7114 of the array 7112. In an embodiment, a third and fourth energy propagation paths 7140, 7141 may also converge at a location 7132 on the first side 7116 of the array 7112. In an embodiment, a fifth and sixth energy propagation paths 7142, 7143 may also converge at a location 7136 between the first and second sides 7116, 7114 of the array 7112.

FIGS. 7E-7L are illustrations of various embodiments of energy inhibiting element 7124. For the avoidance of doubt, these embodiments are provided for exemplary purposes and in no way limiting to the scope of the combinations or implementations provided within the scope of this disclosure.

FIG. 7E illustrates an embodiment of the plurality of energy locations 7118 wherein an energy inhibiting element 7251 is placed adjacent to the surface of the energy locations 7118 and comprises a specified refractive, diffractive, reflective, or other energy altering property. The energy inhibiting element 7251 may be configured to limit the first subset of energy propagation paths 7290 to a smaller range of propagation paths 7253 by inhibiting propagation of energy along energy propagation paths 7252. In an embodiment, the energy inhibiting element is an energy relay with a numerical aperture less than 1.

FIG. 7F illustrates an embodiment of the plurality of energy locations 7118 wherein an energy inhibiting structure 7254 is placed orthogonal between regions of energy locations 7118, and wherein the energy inhibiting structure 7254 exhibits an absorptive property, and wherein the inhibiting energy structure 7254 has a defined height along an energy propagation path 7256 such that certain energy propagation paths 7255 are inhibited. In an embodiment, the energy inhibiting structure 7254 is hexagonal in shape. In an embodiment, the energy inhibiting structure 7254 is round in shape. In an embodiment, the energy inhibiting structure 7254 is non-uniform in shape or size along any orientation of the propagation path. In an embodiment, the energy inhibiting structure 7254 is embedded within another structure with additional properties.

FIG. 7G illustrates the plurality of energy locations 7118, wherein a first energy inhibiting structure 7257 is configured to substantially orient energy 7259 propagating therethrough into a first state. A second energy inhibiting structure 7258 is configured to allow energy 7259, which is substantially oriented in the first state, to propagate therethrough, and to limit propagation of energy 7260 oriented substantially dissimilarly to the first state. In an embodiment, the energy inhibiting element 7257, 7258 is an energy polarizing element pair. In an embodiment, the energy inhibiting element 7257, 7258 is an energy wave band pass element pair. In an embodiment, the energy inhibiting element 7257, 7258 is a diffractive waveguide pair.

FIG. 7H illustrates an embodiment of the plurality of energy locations 7118, wherein an energy inhibiting element 7261 is structured to alter energy propagation paths 7263 to a certain extent depending upon which of the plurality of energy locations 7118 the energy propagation paths 7263 extends through. Energy inhibiting element 7261 may alter energy propagation paths 7263 in a uniform or non-uniform way along energy propagation paths 7263 such that certain energy propagation paths 7262 are inhibited. An energy inhibiting structure 7254 is placed orthogonal between regions of energy locations 7118, and wherein the energy inhibiting structure 7254 exhibits an absorptive property, and wherein the inhibiting energy structure 7254 has a defined height along an energy propagation path 7263 such that certain energy propagation paths 7262 are inhibited. In an embodiment, an inhibiting element 7261 is a field lens. In an embodiment, an inhibiting element 7261 is a diffractive waveguide. In an embodiment, an inhibiting element 7261 is a curved waveguide surface.

FIG. 7I illustrates an embodiment of the plurality of energy locations 7118, wherein an energy inhibiting element 7264 provides an absorptive property to limit the propagation of energy 7266 while allowing other propagation paths 7267 to pass.

FIG. 7J illustrates an embodiment of the plurality of energy locations 7118, and the plurality of energy waveguides 7112, wherein a first energy inhibiting structure 7268 is configured to substantially orient energy 7270 propagating therethrough into a first state. A second energy inhibiting structure 7271 is configured to allow energy 7270, which is substantially oriented in the first state, to propagate therethrough, and to limit propagation of energy 7269 oriented substantially dissimilarly to the first state. In order to further control energy propagation through a system, exemplified by the stray energy propagation 7272, energy inhibiting structures 7268, 7271 may require a compound energy inhibiting element to ensure energy propagation maintains accurate propagation paths.

FIG. 7K illustrates an embodiment of the plurality of energy locations 7118, and wherein an energy inhibiting element 7276 provides an absorptive property to limit the propagation of energy along energy propagation path 7278 while allowing other energy along energy propagation path 7277 to pass through a pair of energy waveguides 7112 for an effective aperture 7284 within the array of waveguides 7112. In an embodiment, energy inhibiting element 7276 comprises black chrome. In an embodiment, energy inhibiting element 7276 comprises an absorptive material. In an embodiment, energy inhibiting element 7276 comprises a transparent pixel array. In an embodiment, energy inhibiting element 7276 comprises an anodized material.

FIG. 7L illustrates an embodiment comprising a plurality of energy locations 7118, and a plurality of energy waveguides 7112, wherein a first energy inhibiting structure 7251 is placed adjacent to the surface of the energy locations 7118 and comprises a specified refractive, diffractive, reflective, or other energy altering property. The energy inhibiting structure 7251 may be configured to limit the first subset of energy propagation paths 7290 to a smaller range of propagation paths 7275 by inhibiting propagation of energy along energy propagation paths 7274. A second energy inhibiting structure 7261 is structured to alter energy propagation paths 7275 to a certain extent depending upon which of the plurality of energy locations 7118 the energy propagation paths 7275 extends through. Energy inhibiting structure 7261 may alter energy propagation paths 7275 in a uniform or non-uniform way such that certain energy propagation paths 7274 are inhibited. A third energy inhibiting structure 7254 is placed orthogonal between regions of energy locations 7118. The energy inhibiting structure 7254 exhibits an absorptive property, and has a defined height along an energy propagation path 7275 such that certain energy propagation paths 7274 are inhibited. An energy inhibiting element 7276 provides an absorptive property to limit the propagation of energy 7280 while allowing energy 7281 to pass through. A compound system of similar or dissimilar waveguide elements 7112 are positioned to substantially fill an effective waveguide element aperture 7285 with energy from the plurality of energy locations 7118 and to alter the propagation path 7273 of energy as defined by a particular system.

Referring back to FIG. 7C, in an embodiment, the energy inhibiting structure 7124 may be located proximate the first energy location 7122 and generally extend towards the first energy waveguide 7104. In an embodiment, the energy inhibiting structure 7124 may be located proximate the first energy waveguide 7104 and generally extend towards the first energy location 7122.

In one embodiment, the energy system is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

In another embodiment, the energy system is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

In yet another embodiment, the singular seamless energy surface is operable to guide localized light transmission to within three or less wavelengths of visible light.

Figure 8:
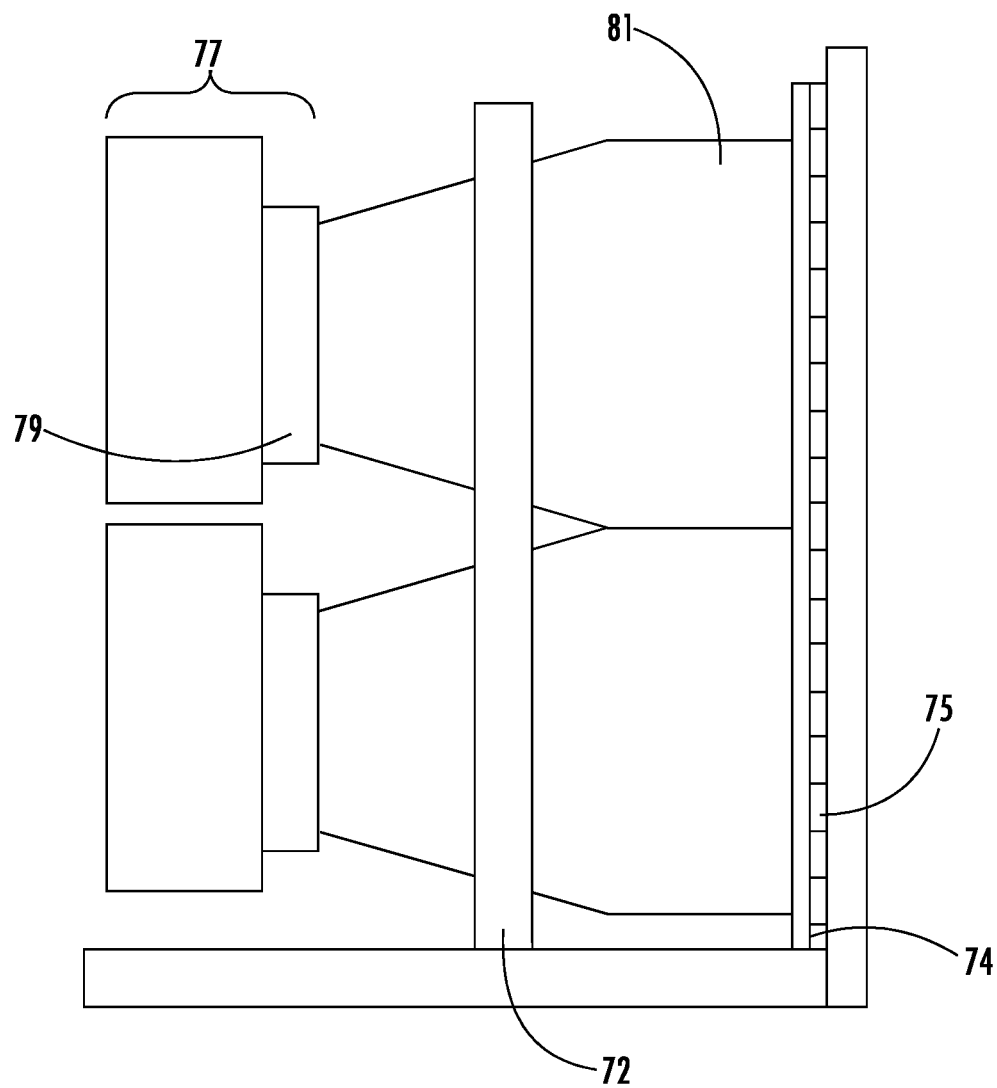
FIG. 8 illustrates an orthogonal view of the energy waveguide system of FIG. 7A.

FIG. 8 illustrates an orthogonal view of two relay elements mounted to a base structure 72, in accordance with one embodiment of the present disclosure. FIG. 8 illustrates one such embodiment wherein two energy relay elements 81 are mounted to a base structure 72, and an energy emissive device 79 is mounted to the rear of the relay elements 81 along with the device electronics 77. The system may further comprise an energy waveguide comprising one or more elements having one or more apertures.

Device electronics may be mounted directly to the pins of the device, attached to the electronics with a socket such as a zero-insertion force (ZIF) connector, interposer and/or the like, to provide simplified installation and maintenance of the system. In one embodiment, device electronic components including display boards, FPGAs, ASICs, 10 devices or similarly required components necessary for the use of said device, may be mounted or tethered on flex or flexi-rigid cables in order to produce an offset between the display mounting plane and the location of the physical electronic package. Additional mechanical structures are provided to mount the electronics as necessary for the device. This provides the ability to increase density of the relay elements, thereby reducing the mechanical magnification for any tapered relay elements and decreasing overall mechanical size and/or weight.

In an additional embodiment, two relay elements are mounted to a base structure, a device is mounted to the rear of the second relay element, and an interposer board connects the device to a flex cable and the flex cable to the electronics in a configuration that is no longer directly behind the relay assembly and mounted to a base structure that is up to +/−90 degrees offset from the relay axis with electronics alternating in the positive and negative orientation respectively to provide additional spacing for the physical mechanical envelope(s).

Cooling structures may be designed to maintain system performance within a specified temperature range, wherein mechanical structures may include a liquid cooling system with a solid-state liquid cooling system providing sufficient pressure on a thermostat regulator. Additional embodiments may include Peltier units or heat syncs and/or the like to maintain consistent system performance for the electronics, devices, relays and/or any other components sensitive to temperature changes during operation or that may produce excess heat.

Behind the relay element may exist a second, third or more additional relay elements. These additional relay elements may include various form factors for mechanical stability and or other energy relay properties. The ability to create various shapes outside of the active device area provides the ability to couple multiple relay elements in series to the same base structure through clamping structures, bonding processes, or any other mechanical means required to hold one or more relay elements in place. The various shapes may be formed out of optical materials or bonded additional appropriate materials. The mechanical structure leveraged to hold the resultant shape may be the same form to fit over top of said structure. In one embodiment, the relay element is designed with a square shape that is 10% of the total length of the relay element, but 25% greater than the active device area along width and height. This relay element is clamped with the matched mechanical structure and may leverage refractive index matching oil, refractive index matched epoxy, or the like. The process to place any two relay elements in series may include mechanical or active alignment wherein visual feedback is provided to ensure appropriate tolerance of image alignment is performed. Typically, a device is mounted to the rear surface of the relay element prior to alignment, but may or may not be required depending on application.

In an embodiment, the one or more components may include fused or tiled mosaics, wherein any adjacent seams between the mosaics are separated by or less than the minimum perceptible contour as defined by the visual acuity of a human eye having better than 20/40 vision at a distance at or greater than the energy surface height or width perpendicular away from the energy surface.

The one or more components may include optical fiber, silicon, glass, polymer, optical relays, diffractive elements, holographic relay elements, refractive elements, reflective elements, optical face plates, optical combiners, beam splitters, prisms, polarization components, spatial light modulators, active pixels, liquid crystal cells, transparent displays, or any similar materials having Anderson localization or total internal reflection properties for forming the energy surface.

The energy surface may be operable to guiding localized light transmission to within three or less wavelengths of visible light and the one or more components may be formed to accommodate any surface shape, including planar, spherical, cylindrical, conical, faceted, tiled, regular, non-regular, or any other geometric shape for a specified application.

Figure 9A:
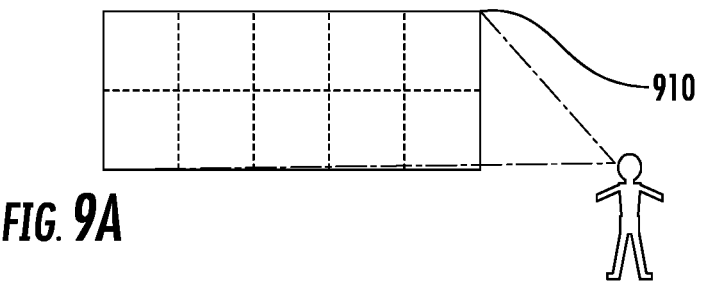
FIGS. 9A-9D illustrate four perspective views of tiling multiple energy systems to form a seamless environment, in accordance with four embodiments of the present disclosure.
Figure 9B:
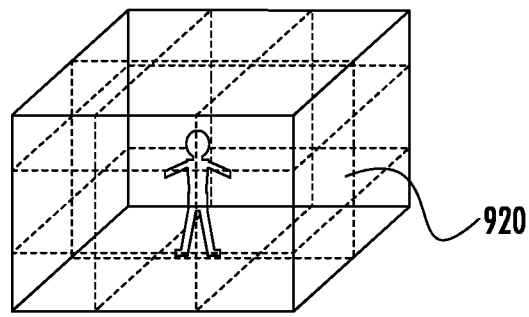
Figure 9C:
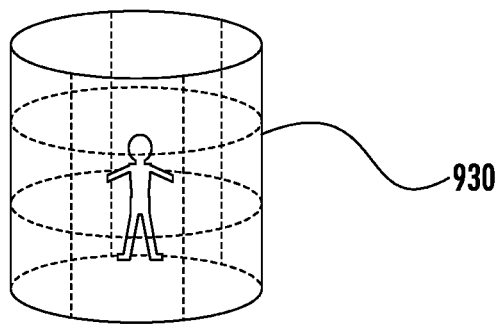
Figure 9D:
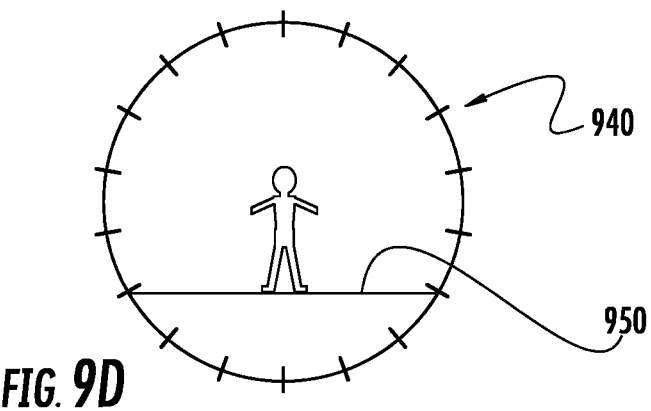

FIGS. 9A-9D illustrate four perspective views of tiling multiple energy waveguide systems to form a seamless environment in different shapes, in accordance with four embodiments of the present disclosure. FIG. 9A illustrates a perspective view of a large format aggregated seamless energy surface 910. FIG. 9B illustrates a perspective view of a six-sided aggregated seamless surface environment 920. FIG. 9C illustrates a perspective view of a cylindrical aggregated energy environment 930. FIG. 9D illustrates a perspective view of a spherical aggregated energy surface environment 940 with a transparent platform 950 within.

Leveraging the resultant optimized energy system from FIGS. 7A-L and 8 and energy waveguide and surface seaming processes, it is possible to further increase the effective size of the system by tiling each of the energy surfaces and waveguide elements to produce any size, shape, or form-factor desired. It is important to note that the waveguide element may exhibit a seam artifact by virtue of non-square grid waveguide element packing schema. To counter this effect, either a larger singular waveguide may be produced, refractive matching materials may be leveraged between the edges of any two surfaces and cut to the angle required for a specified environment (e.g. systems placed at 90 degrees of each other may require a 45 degree bezel cut for simplified bonding, although other methodologies may be leveraged), and/or regular waveguide grid structures may be employed to ensure that no waveguide elements are split between two waveguide surfaces. Further, it is possible to leverage non-square grid waveguide element structures and form a complex mechanical seam that follows the contour of the non-square grid pattern and aligns to the light inhibiting elements within the waveguide structures to provide a seam at the location of a non-energy transmitting location of the waveguide element.

Figure 9E:
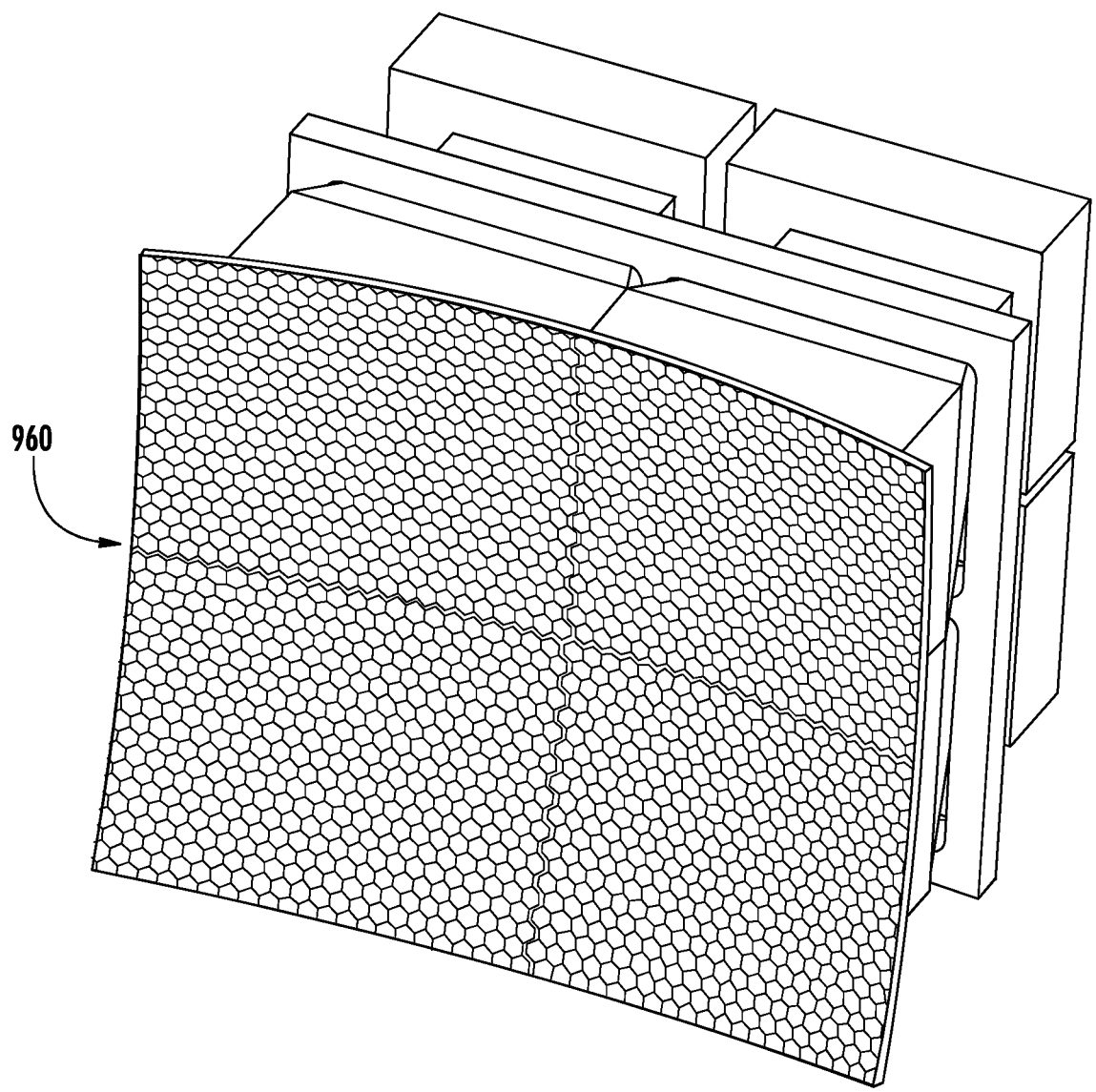
FIG. 9E illustrates the curved waveguide surface and energy devices of an energy waveguide system, in accordance with one embodiment of the present disclosure.

FIG. 9E illustrates, in one embodiment, one such tiled curved waveguide and energy surface 960 wherein the mechanical seam follows the structure of the edge of the walls of the light inhibiting elements within the waveguide structures and leverages a bonding, mechanical alignment, fusing, or the like process between the adjacent walls of both of the energy surfaces and waveguide surfaces to form the seamless energy waveguide system. As shown in the figure, the curved waveguide and energy surface 960 includes four separate systems where waveguide seams can be seen prior to bonding, but may become seamless once bonded. It will be appreciated by one skilled in the art that there can be more or fewer than four separate systems and that the energy surface can have any sizes depending on application.

In an embodiment, a tiled array of seamless energy systems are constructed to form a room scale 2D, light field and/or holographic display. These displays may be seamless across large planar or curved walls, may be produced to cover all walls in a cubic fashion, or may be produced in a curved configuration where either a cylindrical-type shape, or a spherical-type shape is formed to increase view angle efficiency of the overall system. Nothing in this description should assume that it is not possible to directly construct a room sized device directly, this embodiment is disclosed as a variation to fabrication methodologies and to further expand the utilization of a single product line into larger devices through tiling, fusing, bonding, attaching, and/or stitching. Further, nothing in this description should be interpreted to limit the room sizes, scales, shapes designs or any other limiting attribute to the ability to generate arbitrary tiled shapes to generate a completely immersive energy environment.

As further embodiments of the above, the energy waveguide systems and the energy relay systems of FIGS. 7A-L and 8 may be assembled in any combination to form various aggregated seamless surfaces. For example, FIG. 9A illustrates a cinema/wall sized large screen planar seamless energy surface, FIG. 9B illustrates a rectangular room with four walls and/or six surfaces to additionally comprise the ceiling and/or floor covered with planar and tiled seamless energy surfaces, FIG. 9C illustrates a tiled curved surface that produces a cylindrically shaped seamless environment, and FIG. 9D illustrates a spherical or dome environment designed from the curved surfaces of each individual energy surfaces and tiled to form the seamless spherical environment.

In some embodiments, a plurality of energy waveguide systems and the energy relay systems, similar to those discussed above, may be formed into an aggregation system, where the plurality of energy systems are assembled to form a single planar or curved surface to create a seamless aggregate surface oriented in a perpendicular configuration with respect to a floor surface, similar to the aggregated seamless energy surface 910 shown in FIG. 9A.

In other embodiments, a plurality of energy waveguide systems and the energy relay systems, similar to those discussed above, may be formed into an aggregation system, where the plurality of energy systems are assembled to form a single planar or curved surface to create a seamless aggregate surface oriented in a parallel configuration with respect to a floor surface, similar to the transparent platform 950 as shown in FIG. 9D.

In some embodiments, a plurality of energy waveguide systems and the energy relay systems, similar to those discussed above, may be formed into an aggregation system, where the plurality of energy systems are assembled to form two or more planar or curved surfaces to create a seamless aggregate surface across any combination of objects including tables, walls, ceiling, floor or other surfaces.

In other embodiments, a plurality of energy waveguide systems and the energy relay systems, similar to those discussed above, may be formed into an aggregation system, where the plurality of energy systems are assembled to form three planar or curved surfaces to create a seamless aggregate surface across three adjacent walls.

In some embodiments, a plurality of energy waveguide systems and the energy relay systems, similar to those discussed above, may be formed into an aggregation system, where the plurality of energy systems are assembled to form four planar or curved surfaces to create a seamless aggregate surface across four enclosed walls.

In other embodiments, a plurality of energy waveguide systems and the energy relay systems, similar to those discussed above, may be formed into an aggregation system, where the plurality of energy systems are assembled to form five planar or curved surfaces to create a seamless aggregate surface across any combination of objects including tables, walls, ceiling, floor or other surfaces.

In some embodiments, a plurality of energy waveguide systems and the energy relay systems, similar to those discussed above, may be formed into an aggregation system, where the plurality of energy systems are assembled to form six planar or curved surfaces to create a seamless aggregate surface across four objects including tables, walls, ceiling, floor or other surfaces, in an enclosed environment, similar to the aggregated seamless energy surface 920 shown in FIG. 9B.

In other embodiments, a plurality of energy waveguide systems and the energy relay systems, similar to those discussed above, may be formed into an aggregation system, where the plurality of energy systems are assembled to form a planar or curved surface to create a seamless aggregate cylindrical surface across any range of angles, volumes and combinations of objects including tables, walls, ceiling, floor or other surfaces, similar to the aggregated seamless energy surface 930 shown in FIG. 9C.

In some embodiments, a plurality of energy waveguide systems and the energy relay systems, similar to those discussed above, may be formed into an aggregation system, where the plurality of energy systems are assembled to form a planar or curved surface to create a seamless aggregate spherical or domed surface across any range of angles, volumes and combinations of objects including tables, walls, ceiling, floor or other surfaces, similar to the aggregated seamless energy surface 940 shown in FIG. 9D.

As depicted in FIGS. 9A-9D, each system may further include an assembly of the systems from FIGS. 7A-L and 8 having tiled, light field optomechanical systems, and each system may be configured for light field display and other bidirectional energy emission, reflection, or sensing. Each system may comprise a base structure, one or more components forming an energy surface, one or more elements forming a waveguide capable of altering the path of energy waves transmitted to or received from the energy surface, one or more energy devices emitting or receiving energy waves to or from the energy surface, and one or more electronic components. In an embodiment, the energy surface, the waveguide, the energy devices, and the electronic components are secured to the base structure. And in another embodiment, the assembly is arbitrarily shaped to form a seamless, tiled optomechanical display.

In one embodiment, the energy relay system may further include relay elements including faceplates and optical tapers. In another embodiment, the array of energy waveguides may be bonded into a single waveguide component. In some embodiments, the energy relay system may be aligned and calibrated to the singular seamless energy surface passively or actively with up to pixel-by-pixel rectification leveraging an external calibration tooling station or alignment hardware.

In one embodiment, the energy waveguide system may be mounted parallel to the base structure. In another embodiment, the singular seamless energy surface may be mounted orthogonal to the base structure.

In one embodiment, the one or more relay elements includes fused or tiled mosaics, where any seams between adjacent fused or tiled mosaics are separated by or are less than the minimum perceptible contour as defined by the visual acuity of a human eye having better than 20/40 vision at a distance at or greater than the width or height of the singular seamless energy surface.

In operation, the energy system may be configured to relay light to form 2D, stereoscopic, multiview, plenoptic, 4D, volumetric, light field, holographic, or any other visual representation of light. In other embodiments, the energy system may be operable to emit, reflect or converge frequencies to induce tactile sensation or volumetric haptic feedback.

In some embodiments, the array of energy waveguide is designed to project rays up to 360 degrees along a horizontal axis with additional rays in a vertical axis, and limiting rays perpendicular to the singular seamless energy surface. In other embodiments, the energy system is configured for a floor-mounted assembly or a ceiling-mounted assembly, and optionally includes a transparent surface above the floor-mounted assembly.

Figure 12:
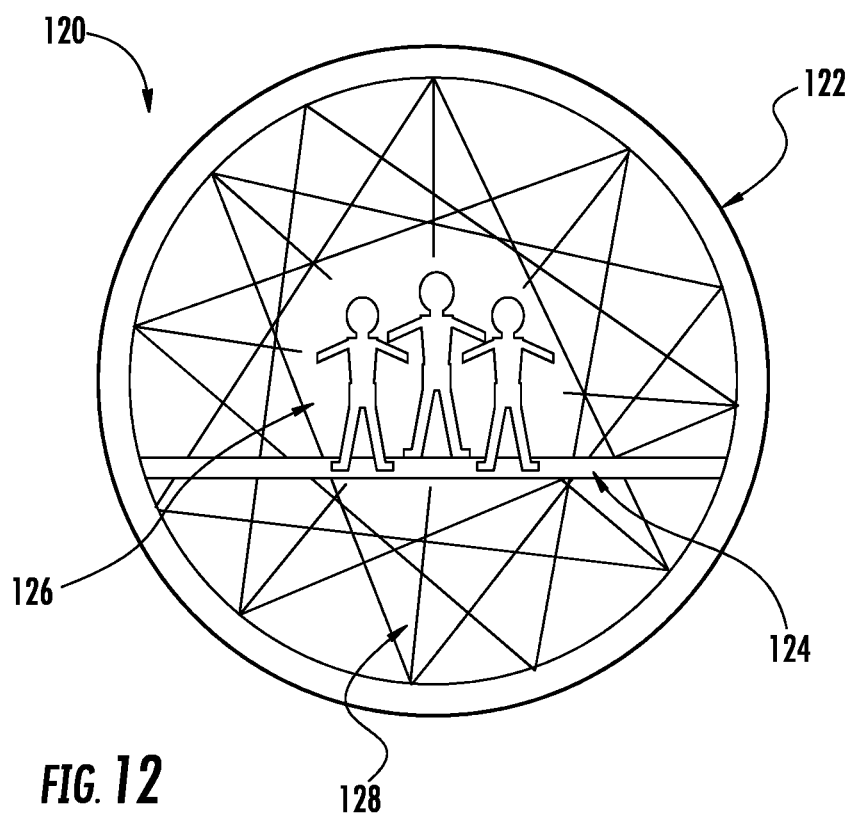
FIG. 12 illustrates an orthogonal view of a spherical structure where a viewing volume is surrounded by tiled energy waveguide systems, in accordance with one embodiment of the present disclosure.

Reference is now made to FIG. 12, which is a further embodiment of FIG. 9D, wherein an orthogonal view of a spherical structure 120 illustrates where viewers are surrounded by tiled and curved energy surfaces 122 and are elevated above the bottom floor surface on a transparent platform 124, in accordance with one embodiment of the present disclosure. FIG. 12 exemplifies the approach of decreasing angle of view requirements when placing a viewer within a central environment volume wherein a viewer or series of viewers exist within a range of volume (e.g., central viewing volume 126) and demonstrates the relative angles of view required for each waveguide element for a given central viewing range (e.g., range of space that the viewers may move around without loss of energy resolution).

A further embodiment of the above where equal or non-linear distribution of the rays are produced with or without Fresnel, diffractive, gradient index, holographic optical element, digitally encoded or otherwise customized waveguide configurations for wall-mounted and/or table-mounted energy waveguide structures as well as all room or environment based energy surface structures where multiple systems are tiled.

A further embodiment where a completely spherical or near-spherical or conical, cubic or other surrounding geometry, tiled energy structures are produced and viewers walk on a transparent platform 124 such that the energy surfaces 122 are viewable in a radius surrounding the viewing volume 126. In such a case, the rays 128 propagate more normal to the radial waveguide surface and leverage wall-mounted type waveguide structures 122 with distribution including perpendicular angles in relation to the normal of the curved surface in the required AOV.

Figure 11:
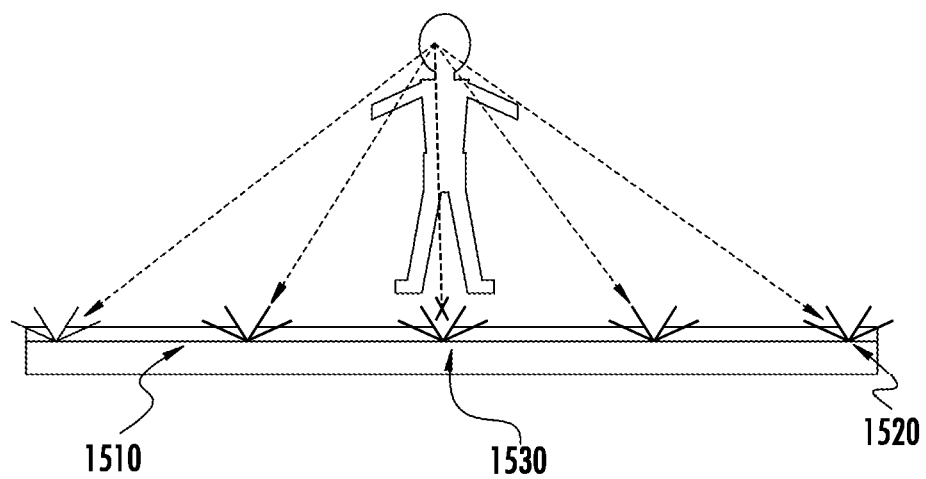
FIG. 11 illustrates an orthogonal view of a floor-mounted tiled energy waveguide system, in accordance with one embodiment of the present disclosure.

FIG. 12 further illustrates spherical, conical and any non-planar enveloping surface where the viewing volume exists within a certain relative energy focus position from the energy surfaces, resulting in the possible optimization of a reduction of required angles of view from each respective waveguide. This phenomenon is produced by virtue of the normal of the waveguide maintaining a much tighter relationship between the viewer and the energy surface thus reducing the necessity for increased angles of view that are traditionally required for planar surfaces. FIG. 11 exemplifies this approach wherein a viewer or series of viewers exist within a range of volume and demonstrates the relative angles of view required for each waveguide for a given central viewing range (range of space that the viewers may move around without loss of energy propagation).

It is additionally possible to include multiple focus positions by altering the waveguide prescription or by stacking multiple waveguides or both to produce multiple regions of density along the z-axis when directed to target specific regions in space for specific applications. It is additionally possible to layer multiple transmissive and/or one non-transmissive and multiple transmissive energy surfaces wherein the waveguide provides the ability to increase effective resolution through various means of time sequential, spatial, or spatiotemporal super resolution, and may comprise two or more surfaces focused at differing positions resulting in a change in propagation angle per energy surface and/or altering the physical location of the energy surface in relation to each other to produce angular dependencies in resultant energy values.

FIGS. 12, 9C and 9D additionally may include curved waveguides commensurate with the curvature of the energy surface. The ability to generate a waveguide function that varies sampling frequency over field distance is a characteristic of various distortions and known in the art. Traditionally, the inclusion of distortions are undesirable in a waveguide profile, however, for the purposes of curved waveguide element design, these are all characteristics that further control and distribute the rays of light depending on the specific viewing conditions desired. It may require the addition of multiple prescriptions, elements, layers or a gradient of prescriptions across the entirety of the waveguide depending on the application and environment requirements.

An additional embodiment of the above where the prescriptions are further optimized by the curved surfaces of the energy surface and/or the waveguide element. The variation of the normal of the chief ray angle (CRA) in relation to the energy surface itself may further increase efficiency and require a different prescription than a planar waveguide, although the gradient, variation and/or optimization of the waveguide element still applies.

In a similar fashion as described for the variation of waveguide prescription to produce different energy ray densities depending on distance and desired density as a function of spatial location, it is additionally possible to further refine the prescription to generate a horizontally viewable table-mounted waveguide.

Returning now to FIG. 10A illustrates a waveguide system 1400 having a waveguide element that exhibits a non-regular distribution of energy designed to redistribute energy from a perpendicular orientation in relation to waveguide surface to steeper angles throughout the element. In this embodiment, the plurality of energy waveguides may include diffractive waveguide elements 1402, and demonstrates one proposed structure for a modified Fresnel waveguide element structure 1404 on a seamless energy surface 1408 that produces an effectively extremely short focal length and low f/number while simultaneously directing rays of energy to explicitly defined locations excluding 1406. In another embodiment, the waveguide system 1400 includes non-regular waveguides 1410. In operation, there may be energy propagation within a first region 1420 while there may be no energy propagation within a second region 1430.

FIG. 10B illustrates an orthogonal view of a table-mounted energy surface 1450 leveraging the waveguide elements from FIG. 10A, in accordance with one embodiment of the present disclosure. FIG. 10B illustrates the variables to consider with a table-mounted energy surface to help articulate how it is possible to identify the specific system requirements. The considerations and goals for any such system design is to produce an optimal distribution of energy for a given environment.

For example, the energy surface 1450 may be oriented parallel to a ground plane and for a given range of vertical and horizontal locations, configured to distribute energy with density appropriate for a desired vertical and horizontal field of view 1455 around region 1460. In one embodiment, a table-mounted energy system requires the horizontal AOV to be 180 degrees and the vertical to be 45 degrees. In a second embodiment, a table-mounted energy system requires the horizontal AOV to be 360 degrees and the vertical to be 60 degrees. These embodiments are presented for exemplary purposes only and in no way intended to limit the scope of the numerous variations of system specifications that may be designed.

As FIG. 10B illustrates, everything outside of the desired field of view is un-utilized space. Taking the 360-degree example provided, while the full 360 horizontal degrees require sufficient energy density, there are potentially 30 degrees of vertical locations that are not required. While one may simply provide no energy to these regions in space, a design with a waveguide function that provides information across 180×180 degrees (when positioned perpendicular on a wall, 360 by 90 degrees when placed parallel on a table), this is generally not efficient and results in energy densities that may not be practical based upon the target markets.

FIG. 10B illustrates an embodiment wherein the optomechanical assembly comprises a waveguide exhibiting non-regular distribution of energy providing 360 degrees in a horizontal axis and a limited distribution in a vertical axis with the energy surface parallel to a ground plane, by redirecting rays that would have otherwise been projected perpendicular to the energy surface. The assembly may be configured for a floor-mounted assembly or a ceiling-mounted assembly, and optionally includes a transparent platform above the floor-mounted assembly similar to those discussed above.

In one embodiment, the energy surface 1450 may include modified waveguides having a viewing volume 1475 with a horizontal field of view 1455. In this embodiment, the rays in region 1460 may be limited by the modified waveguides on the energy surface 1450.

Figure 10C:
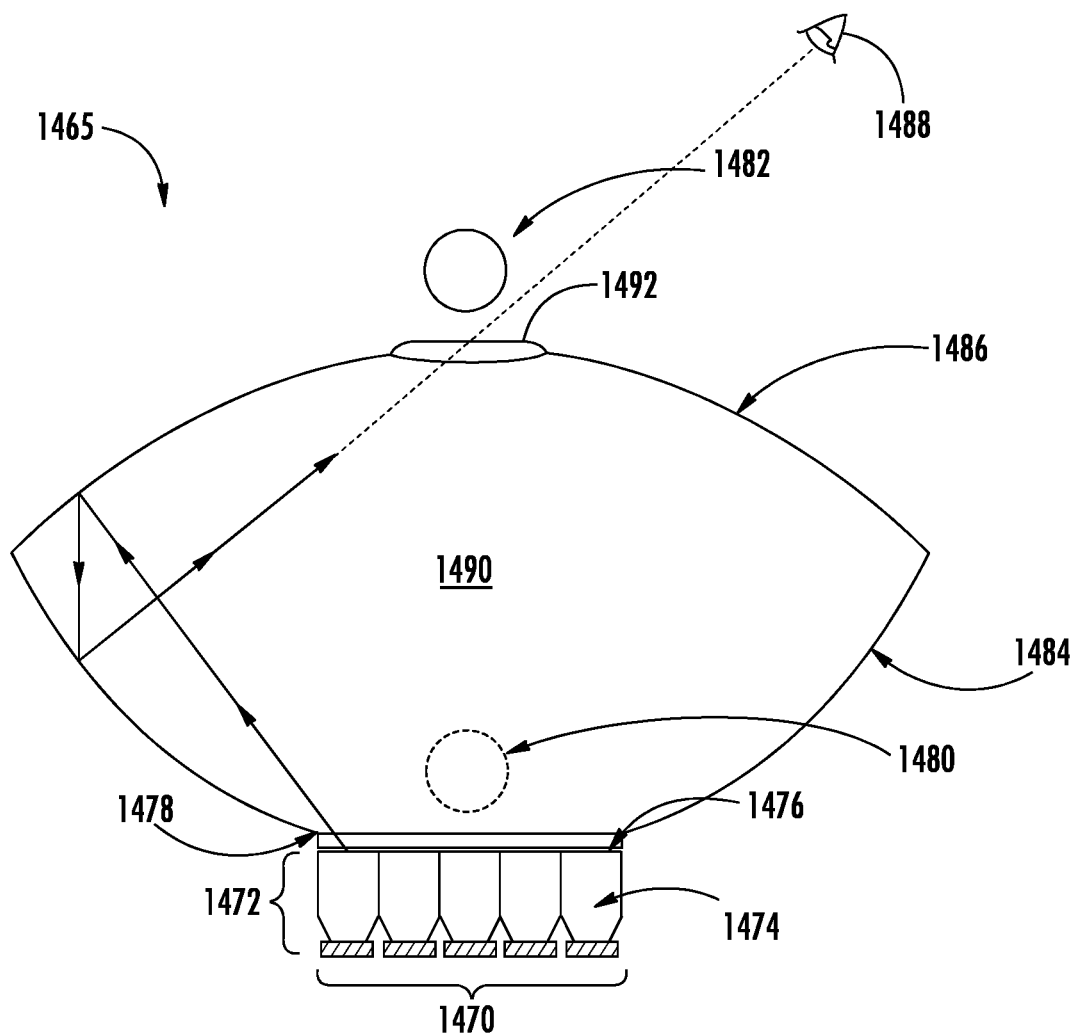
FIG. 10C illustrates an orthogonal view of a table-mounted waveguide system with an additional reflective waveguide elements, in accordance with one embodiment of the present disclosure.

FIG. 10C illustrates an embodiment of the table-mounted waveguide system of FIG. 10B comprising additional reflective waveguide elements having an aperture to allow relayed converging energy from a first surface to a second offset surface, and wherein the second surface is virtual. In one embodiment, the system further includes a reflective waveguide element having an aperture to relay converging energy from the singular seamless energy surface to virtual space.

In one embodiment, the waveguide system 1465 includes energy waveguide 1478. The energy waveguide 1478 may be coupled to a plurality of energy relays 1474 to form a seamless energy surface 1476 in similar fashion as described above. Although five energy relays 1470 are shown, it will be understood that there can be more or fewer energy relays. In one embodiment, the height 1472 of the energy relays 1470, the energy relays 1474 and the seamless energy surface 1476 may vary in relation to the object or focus as can be appreciated and understood by one of ordinary skill in the art.

In some embodiments, the table-mounted waveguide system 1465 may include an additional reflective waveguide element 1490 having a first reflector surface 1486 and a second reflector surface 1484. The reflective waveguide element 1490 may include an aperture 1492 such that converging energy from the energy waveguide 1478 may be relayed from the first reflector surface 1486 to the second reflector surface 1484 through the aperture 1492 to a viewer 1488. In other words, a first virtual object 1480 may be relayed and converged at a virtual space to form a second virtual object 1482.

As depicted in the various embodiments of this disclosure, an optomechanical assembly may comprise energy relays inducing transverse Anderson localization and/or energy relays with two or more first or second surfaces for bidirectional propagation of energy.

FIG. 11 illustrates an orthogonal view of a floor-mounted tiled energy surface 1510 with a non-linear distribution of rays, in accordance with one embodiment of the present disclosure. FIG. 11 exemplifies the floor-mounted tiled assembly 1510 with the non-linear distribution of rays that tend to exclude the perpendicular rays to the energy surface. While it may be possible to configure the floor mounted tiled assembly 1510 in the same waveguide structure as the other environment surfaces where perpendicular rays and off-axis rays are provided with even, or some form of, distribution, however, with the proposed table mounted approach placed at or approximate to the feet of a standing position 1530 (or above or below depending on the requirements for the system), it is possible to further optimize the waveguide configuration as no rays directly perpendicular to the floor assembly 1510 surface may need to be represented as one will be self-occluding these rays with their body and/or feet. As shown in FIG. 11, in the event of a multiple viewer experience, the perpendicular rays will not be viewable by other participants as the rays presented in a perpendicular orientation, unlike walls or ceilings, are occluded or not at the correct view angle to produce artifacts. In other words, the floor assembly 1510 may be configured with modified waveguide elements 1520 such that certain rays may not be visible due to self-occlusion 1530.

Figure 13:
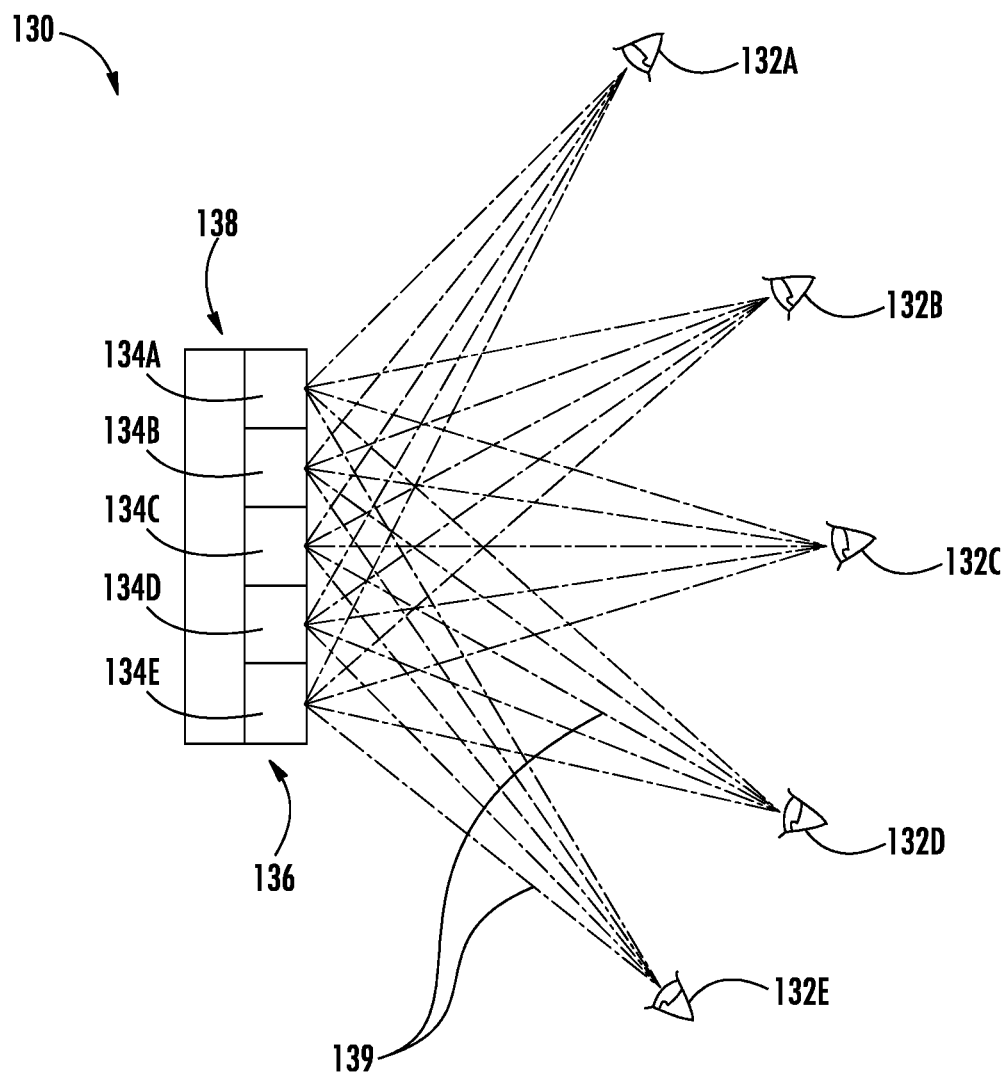
FIG. 13 illustrate an orthogonal view of five viewer locations within a viewing volume and five energy coordinates under each waveguide to propagate a plurality of rays to each viewer location that is unique to a single viewer location, in accordance with one embodiment of the present disclosure.

FIG. 13 illustrates an orthogonal view of a system 130 of five viewer locations 132A-E and five corresponding energy locations 134A-E under each waveguide element 136 to present a single ray bundle to each viewer that is unique to a single viewer location, in accordance with one embodiment of the present disclosure. FIG. 13 illustrates five viewer locations 132A, 132B, 132C, 132D, 132E and five energy locations 134A, 134B, 134C, 134D, 134E for each waveguide element 136 and an energy surface 138. The ray bundles propagated to the viewer locations are a direct result of the waveguide element functions. In this fashion, all energy is propagated up to simultaneously addressing each of the specified viewer locations without additional knowledge of said locations. It is additionally possible to configure the energy system of FIG. 13 to include depth sensing devices and algorithms known in the art to dynamically vary the energy location information propagated to each of the specified viewer locations. This may be applied to one or more viewers. The tracking may be performed as a 2D process or as a 3D/stereoscopic process, or leveraging other depth sensing technologies known in the art. As will be appreciated by one skilled in the art, because of the different viewer locations 132 and the different energy locations 134, unique plurality of rays 139 may be provided to each viewer at his or her respective viewer locations 132.

Figure 14A:
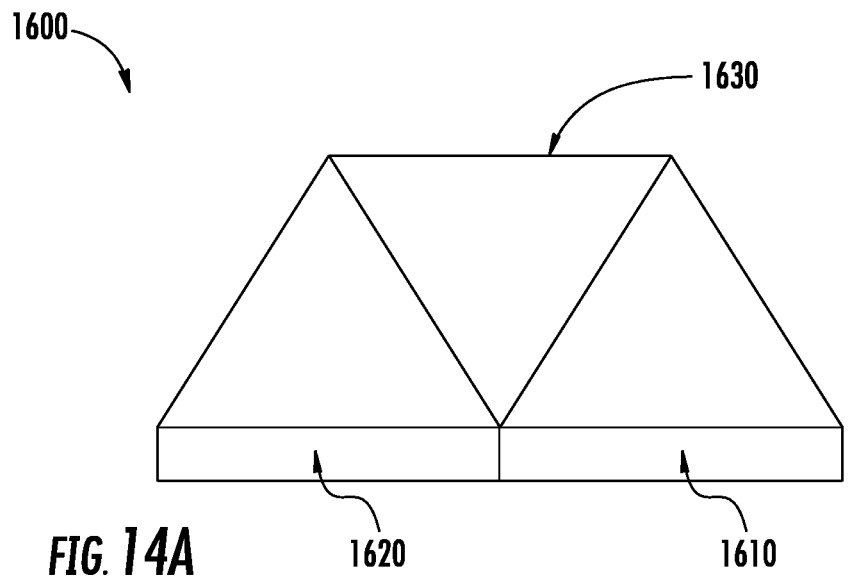
FIG. 14A illustrates an energy relay combining device, in accordance with one embodiment of the present disclosure.

FIG. 14A illustrates an energy relay combining element 1600 that comprises a first surface and two interwoven second surfaces 1630 wherein the second surface 1630 having both an energy emitting device 1610 and an energy sensing device 1620. A further embodiment of FIG. 14A includes an energy relay combining element 1600 having two or more sub-structure components 1610, 1620 for at least one of two or more second relay surfaces 1630, that exhibits different engineered properties between the sub-structure components of the two or more second relay surfaces 1630, including sub-structure diameter, wherein the sub-structure diameter for each of the one or more second surfaces 1630 is substantially similar to the wavelength for a determined energy device and energy frequency domain.

Figure 14B:
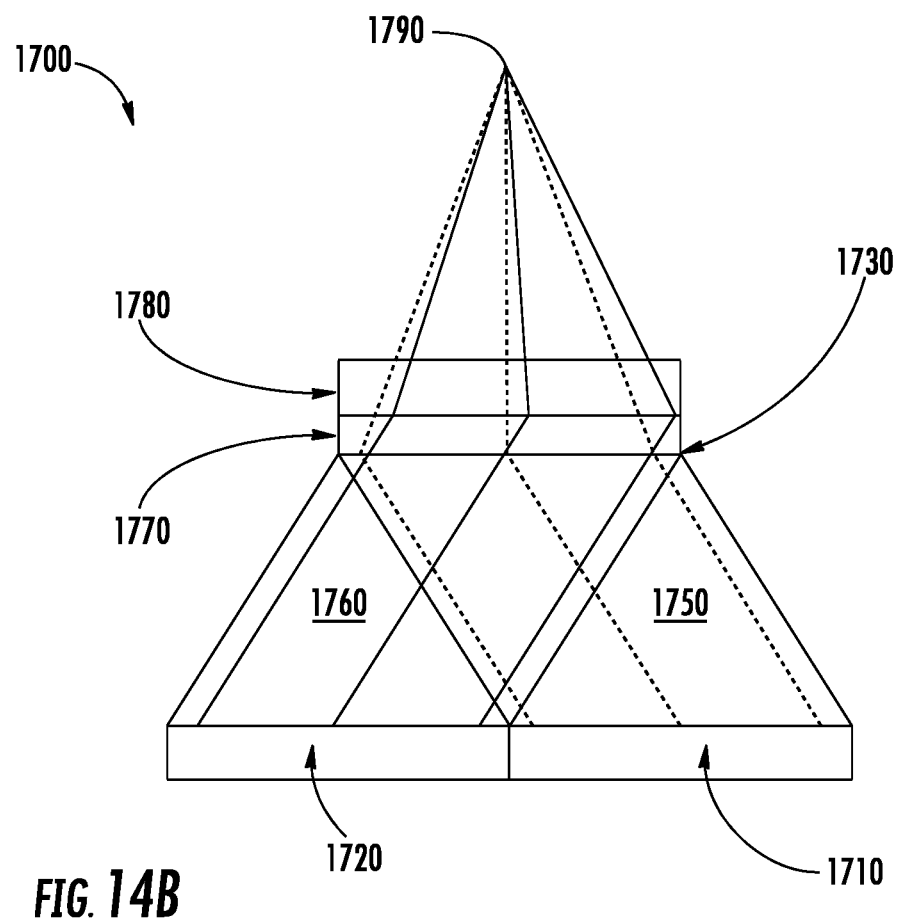
FIG. 14B illustrates a further embodiment of FIG. 14A, in accordance with one embodiment of the present disclosure.

FIG. 14B illustrates a further embodiment of FIG. 14A wherein the energy relay combining element 1700 includes one or more element types 1710, 1720, within one or more waveguide element surfaces 1730 and properties, where each of the element types 1710, 1720 are designed to alter the propagation path 1750, 1760 of a wavelength within the commensurate energy frequency domain. In one embodiment, the energy relay combining element 1700 may include an electromagnetic energy emitting device 1710 and a mechanical energy emitting device 1720, each device 1710, 1720 configured to alter an electromagnetic energy relay path 1750 and a mechanical energy relay path 1760, respectively.

In another embodiment, the wavelengths of any second energy frequency domain may be substantially unaffected by the first energy frequency domain. The combination of multiple energy devices on the two or more second surfaces of the energy relay and the one or more element types within the one or more waveguide elements provides the ability to substantially propagate one or more energy domains through the energy devices, the energy relays, and the energy waveguides substantially independently as required for a specified application.

In one embodiment, the energy relay combining element 1700 may further include an electromagnetic energy waveguide 1770 and a mechanical energy waveguide 1780 assembled in a stacked configuration and coupled to a simultaneously integrated seamless energy surface 1730 similar to that described above. In operation, the energy relay combining element 1700 is able to propagate energy paths such that all the energy is able to converge about a same location 1790.

In some embodiments, this waveguide 1700 may be a single relay element with a bidirectional energy surface, one interlaced segment to propagate energy, and a second interlaced segment to receive energy at the energy surface. In this fashion, this may be repeated for every energy relay module in the system to produce a bidirectional energy surface.

Figure 14C:
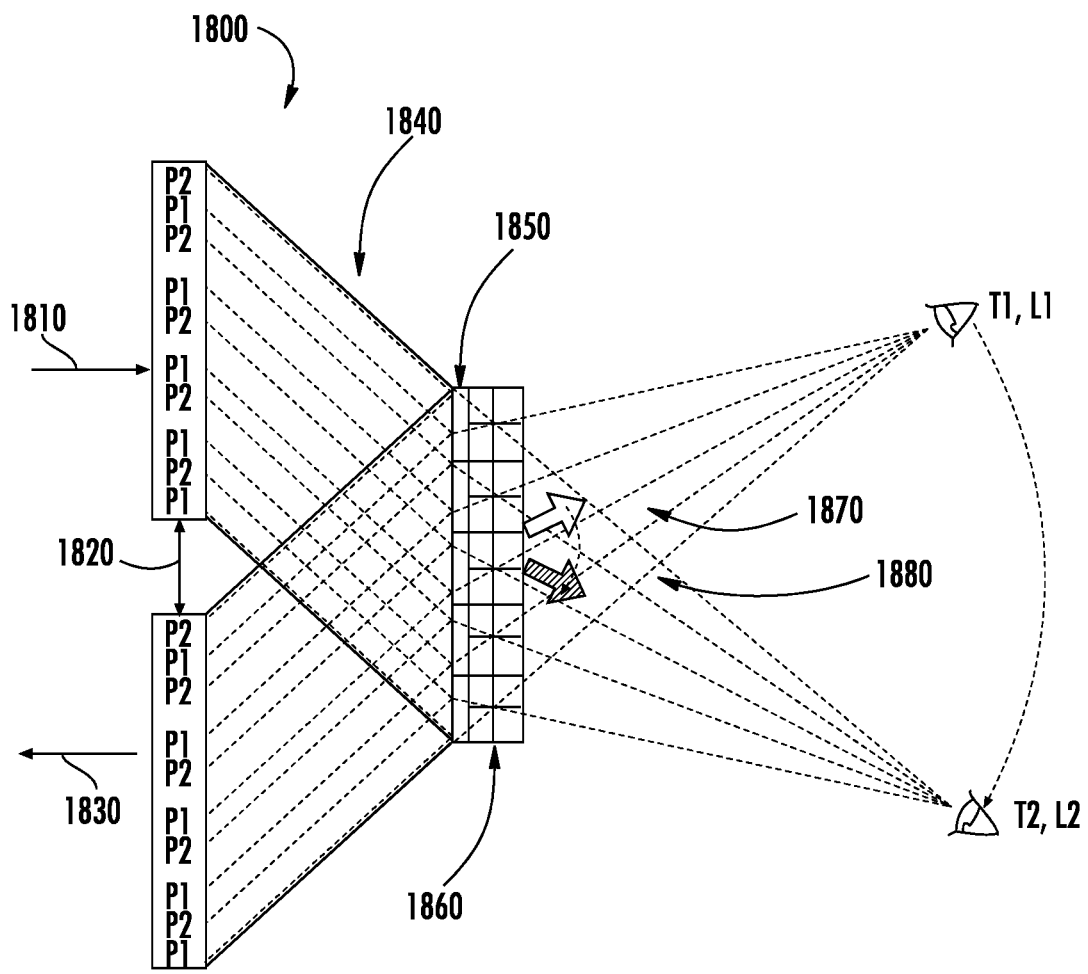
FIG. 14C illustrates an orthogonal view of an implementation of an energy waveguide system, in accordance with one embodiment of the present disclosure.

FIG. 14C illustrates an orthogonal view of a system 1800 as a further embodiment of FIG. 13 and comprises the energy relay combining element of FIG. 14A with a viewer at location L1 and time T1, with converging rays along a path through a waveguide and to energy coordinates P1, and where a viewer moves to location L2 at time T2, with rays converging along a path through a waveguide and to energy coordinates P2, and where each of the plurality of energy coordinates P1 and P2 are formed on a first side of an energy relay surface and includes two interwoven second relay surfaces and provides a first energy sensing device and a second energy emitting device to both sense movement and interaction within the viewing volume through the energy waveguide as well as emit energy through the same energy relay and energy waveguide resulting in the visible change to energy emitted from time and location T1, L1 to T2, L2, in accordance with one embodiment of the present disclosure.

In one embodiment, the system 1800 may include energy devices 1820 where one set of energy devices are configured for energy emission 1810 and another set of energy devices are configured for energy sensing 1830. This embodiment may further include a plurality of relay combining elements 1840 configured to provide a single seamless energy surface 1850. Optionally, a plurality of waveguides 1860 may be disposed in front of the energy surface 1850. In operation, as discussed above, the system 1800 may provide simultaneous bi-directional energy sensing or emission with interactive control with the propagated energy at T1 1870, and modified propagated energy at T2 1880, in response to sensed movement between T1, L1 and T2, L2.

Further embodiments of FIG. 14C include compound systems wherein the energy relay system having more than two second surfaces, and wherein the energy devices may be all of a differing energy domain, and wherein each of the energy devices may each receive or emit energy through a first surface of the energy relay system.

Figure 15:
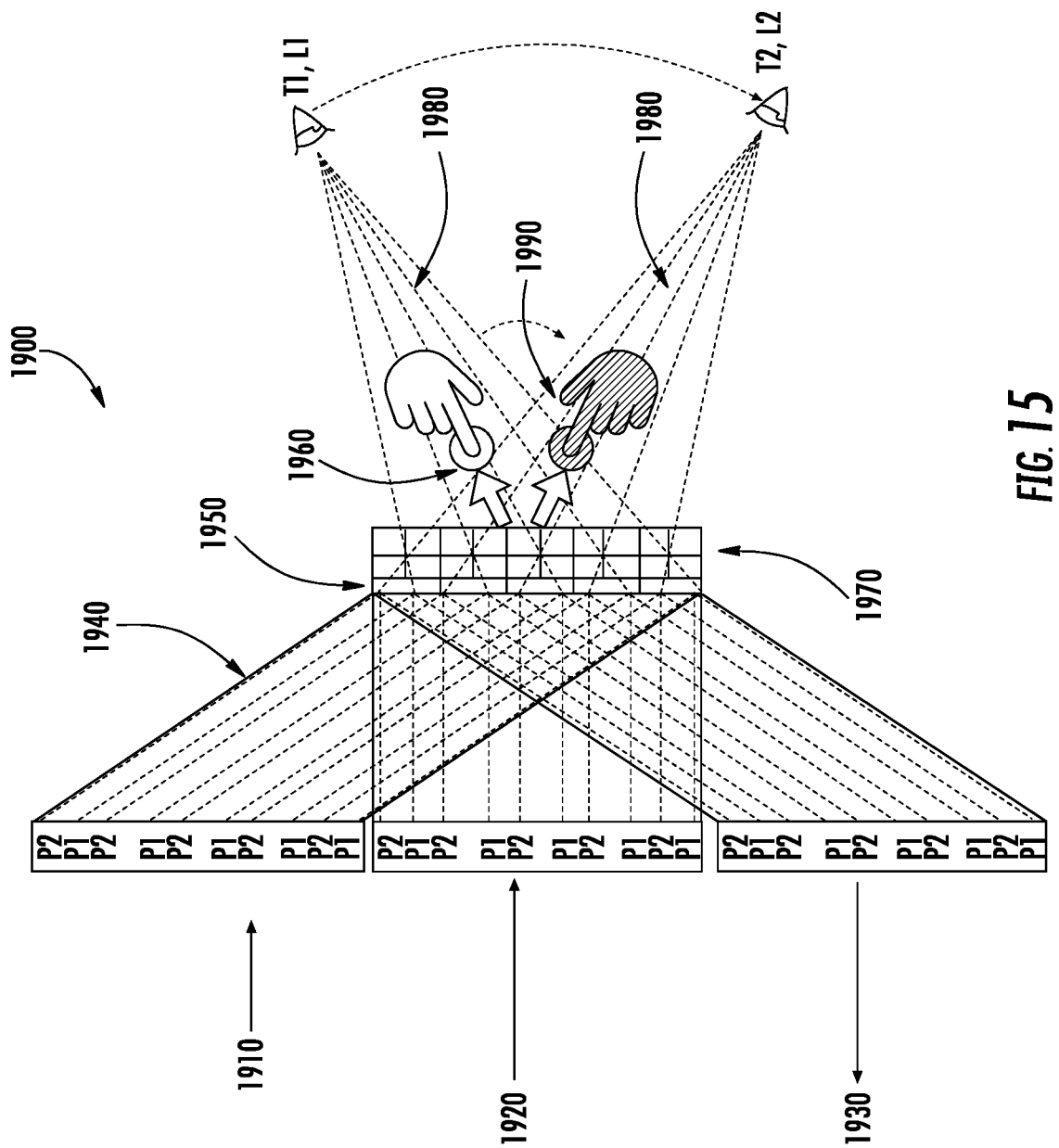
FIG. 15 illustrates an orthogonal view of another implementation of an energy waveguide system, in accordance with one embodiment of the present disclosure.

FIG. 15 illustrates a further compound system 1900 of FIG. 14A with an orthogonal view of an embodiment where a viewer is at location L1 at time T1, with converging rays along a path through a waveguide and to energy coordinates P1, and wherein a viewer moves to location L2 at time T2, with rays converging along a path through a waveguide and to energy coordinates P2, and wherein each of the plurality of energy coordinates P1 and P2 are formed on a first side of an energy relay surface and comprises three second relay surfaces having a first mechanical energy emitting device, a second energy emitting device and a third energy sensing device, wherein the energy waveguide emits both mechanical and energy through the first surface of the energy relay allowing the third energy sensing device to detect interference from the known emitted energy to the sensed received data, and wherein the mechanical energy emission results in the ability to directly interact with the emitted energy, the mechanical energy converging to produce tactile sensation, the energy converging to produce visible illumination, and the energy emitted at T1, L1 to T2, L2 is modified to respond to the tactile interaction between the viewer and the emitted energy, in accordance with one embodiment of the present disclosure.

In one embodiment, the system 1900 may include an ultrasonic energy emission device 1910, an electromagnetic energy emission device 1920, and an electromagnetic sensing device 1930. This embodiment may further include a plurality of relay combining elements 1940 configured to provide a single seamless energy surface 1950. Optionally, a plurality of waveguides 1970 may be disposed in front of the energy surface 1950.

The one or more energy devices may be independently paired with two-or-more-path relay combiners, beam splitters, prisms, polarizers, or other energy combining methodology, to pair at least two energy devices to the same portion of the energy surface. The one or more energy devices may be secured behind the energy surface, proximate to an additional component secured to the base structure, or to a location in front and outside of the FOV of the waveguide for off-axis direct or reflective projection or sensing. The resulting energy surface provides for bidirectional transmission of energy and the waveguide converge energy waves onto the energy device to sense relative depth, proximity, images, color, sound, and other energy, and wherein the sensed energy is processed to perform machine vision related tasks including, but not limited to, 4D eye and retinal tracking through the waveguide array, energy surface and to the energy sensing device.

In operation, as discussed above, the system 1900 may provide simultaneous bi-directional energy sensing or emission with interactive control with the propagated energy at T1 1980, propagated haptics at T1 1960, and modified propagated energy at T2 1990, in response to sensed interference of propagated energy emission from sensed movement and ultrasonic haptic response between T1, L1 and T2, L2.

Figure 16:
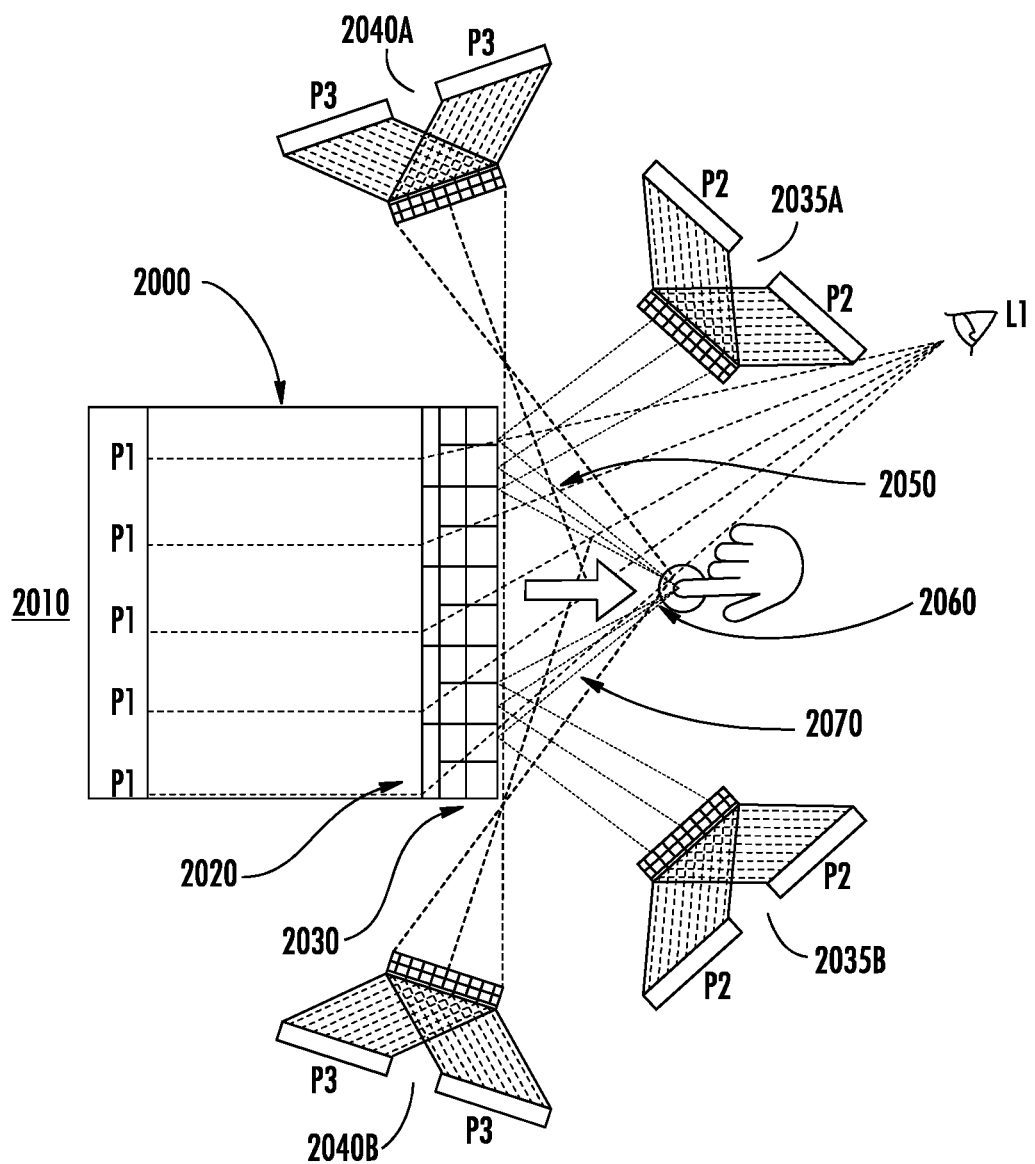
FIG. 16 illustrates an orthogonal view of yet another implementation, in accordance with one embodiment of the present disclosure.

FIG. 16 illustrates an embodiment of pairing one or more energy devices 2010 to additional components (e.g., relay elements 2000 configured to form a single seamless energy surface 2020) where a viewer is at location L1, with converging rays along a path through a waveguide 2030 and to energy coordinates P1, and where each of the plurality of energy coordinates P1 are formed on a first side of an energy relay surface 2020 corresponding to one or more devices, and where the waveguide or relay surface provides an additional reflective or diffractive property and propagated haptics 2060, where the reflective or diffractive property substantially does not affect the propagation of rays at coordinates P1.

In one embodiment, the reflective or diffractive property commensurate for the energy of additional off-axis energy devices 2035A, 2035B, each of devices 2035A, 2035B containing an additional waveguide and energy relay, each additional energy relay containing two or more second surfaces, each with a sensing or emitting device respectively with corresponding energy coordinates P2 propagating through a similar volume as P1 2050. In one embodiment, reflective or diffractive energy can propagate through the devices.

In another embodiment, an additional system out of the field of view in respect to the first and second waveguide elements comprise an additional system 2040A, 2040B having additional waveguide and relay elements, the relay elements having two second surfaces and one first surface, the second surfaces receiving energy from both focused emitting and sensing energy devices.

In one embodiment, the waveguide elements 2040A, 2040B are configured to propagate energy 2070 directly through a desired volume, the desired volume corresponding to the path of energy coordinates P1 and P2, and forming additional energy coordinates P3 passing through the system 2040A, 2040B, each of the sensing and emitting devices configured to detect interference from the known emitted energy to the sensed received data.

In some embodiments, the mechanical energy emission results in the ability to directly interact with the emitted energy, the mechanical energy converging to produce tactile sensation, the energy converging to produce visible illumination, and the energy emitted is modified to respond to the tactile interaction between the viewer and the emitted energy, in accordance with one embodiment of the present disclosure.

Various components within the architecture may be mounted in a number of configurations to include, but not limit, wall mounting, table mounting, head mounting, curved surfaces, non-planar surfaces, or other appropriate implementation of the technology.

FIGS. 14, 15 and 16 illustrates an embodiment wherein the energy surface and the waveguide may be operable to emit, reflect, diffract or converge frequencies to induce tactile sensation or volumetric haptic feedback.

FIGS. 14, 15 and 16 illustrates a bidirectional energy surface comprising (a) a base structure; (b) one or more components collectively forming an energy surface; (c) one or more energy devices; and (d) one or more energy waveguides. The energy surface, devices, and waveguides may mount to the base structure and prescribe an energy waveguide system capable of bidirectional emission and sensing of energy through the energy surface.

In an embodiment, the resulting energy display system provides for the ability to both display and capture simultaneously from the same emissive surface with waveguides designed such that light field data may be projected by an illumination source through the waveguide and simultaneously received through the same energy device surface without additional external devices.

Further, the tracked positions may actively calculate and steer light to specified coordinates to enable variable imagery and other projected frequencies to be guided to prescribed application requirements from the direct coloration between the bidirectional surface image and projection information.

An embodiment of FIGS. 14, 15 and 16 wherein the one or more components are formed to accommodate any surface shape, including planar, spherical, cylindrical, conical, faceted, tiled, regular, non-regular, or any other geometric shape for a specified application or included within the constructs of FIG. 9, 10, 11 or 12.

An embodiment of FIGS. 14, 15 and 16 wherein the one or more components comprise materials that induce transverse Anderson localization.

In one embodiment, an energy system configured to direct energy according to a four-dimensional (4D) plenoptic function includes a plurality of energy devices; an energy relay system having one or more energy relay elements, where each of the one or more energy relay elements includes a first surface and a second surface, the second surface of the one or more energy relay elements being arranged to form a singular seamless energy surface of the energy relay system, and where a first plurality of energy propagation paths extend from the energy locations in the plurality of energy devices through the singular seamless energy surface of the energy relay system. The energy system further includes an energy waveguide system having an array of energy waveguides, where a second plurality of energy propagation paths extend from the singular seamless energy surface through the array of energy waveguides in directions determined by a 4D plenoptic function. In one embodiment, the singular seamless energy surface is operable to both provide and receive energy therethrough.

In one embodiment, the energy system is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

In another embodiment, the energy system is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

In some embodiments, the energy system is configured to sense relative depth, proximity, images, color, sound and other electromagnetic frequencies, and where the sensed energy is processed to perform machine vision related to 4D eye and retinal tracking. In other embodiments, the singular seamless energy surface is further operable to both display and capture simultaneously from the singular seamless energy surface with the energy waveguide system designed such that light field data may be projected by the plurality of energy devices through the energy waveguide system and simultaneously received through the same singular seamless energy surface.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention (s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. An aggregation system comprising a plurality of energy systems, wherein the plurality of energy systems are assembled to form at least one planar or curved surface to create a seamless aggregate surface, and wherein each of the plurality of energy systems comprises:
 a plurality of energy devices;
 an energy relay system comprising one or more energy relay elements, wherein each of the one or more energy relay elements comprises a first surface and a second surface, the second surface of the one or more energy relay elements being arranged to form a singular seamless energy surface of the energy relay system, and wherein a first plurality of energy propagation paths extend from energy locations in the plurality of energy devices through the singular seamless energy surface of the energy relay system; and an energy waveguide system comprising an array of energy waveguides, and wherein a second plurality of energy propagation paths extend from the singular seamless energy surface through the array of energy waveguides in directions determined by a 4D plenoptic function; and wherein the one or more relay elements each comprise first and second component engineered structures and have a higher transport efficiency in a longitudinal orientation than in a transverse orientation; and wherein the energy relay system is operable to transmit energy waves through the first surface of the one or more energy relay elements with a first resolution and through the second surface of the one or more energy relay elements with a second resolution, and wherein the second resolution is no less than about 50% of the first resolution.

2. The aggregation system of claim 1, wherein each of the plurality of energy systems is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

3. The aggregation system of claim 1, wherein each of the plurality of energy systems is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

4. The aggregation system of claim 1, wherein the singular seamless energy surface comprises fused or tiled mosaics and any seams between adjacent fused or tiled mosaics are separated by or are less than the minimum perceptible contour as defined by the visual acuity of a human eye having better than 20/40 vision at a distance at or greater than the width or height of the singular seamless energy surface.

5. The aggregation system of claim 1, wherein the singular seamless energy surface is operable to guide localized light transmission to within three or less wavelengths of visible light.

6. The aggregation system according to claim 1, wherein the plurality of energy systems are assembled to form two or more planar or curved surfaces to create the seamless aggregate surface across any combination of objects in a group comprising: tables, walls, ceiling or floor.

7. The aggregation system according to claim 1, wherein the plurality of energy systems are assembled to form three planar or curved surfaces to create the seamless aggregate surface across three adjacent walls.

8. The aggregation system according to claim 1, wherein the plurality of energy systems are assembled to form four planar or curved surfaces to create the seamless aggregate surface across four enclosed walls.

9. The aggregation system according to claim 1, wherein the seamless aggregate surface comprises a cylindrical surface across any range of angles, volumes and combinations of objects in a group comprising: tables, walls, ceiling or floor.

10. The aggregation system according to claim 1, wherein the seamless aggregate surface comprises a spherical or domed surface across any range of angles, volumes and combinations of objects in a group comprising: tables, walls, ceiling or floor.

11. The aggregation system of claim 1, wherein each of the plurality of energy systems further comprises a reflective waveguide element having an aperture to relay converging energy from the singular seamless energy surface to virtual space.

12. A plurality of energy systems configured to direct energy according to a four-dimensional (4D) plenoptic function, each energy system of the plurality of energy systems comprising:

a plurality of energy devices;

an energy relay system comprising one or more energy relay elements, wherein each of the one or more energy relay elements comprises a first surface and a second surface, the second surface of the one or more energy relay elements being arranged to form a singular seamless energy surface of the energy relay system, and wherein a first plurality of energy propagation paths extend from energy locations in the plurality of energy devices through the singular seamless energy surface of the energy relay system; and an energy waveguide system comprising an array of energy waveguides, and wherein a second plurality of energy propagation paths extend from the singular seamless energy surface through the array of energy waveguides in directions determined by a 4D plenoptic function wherein the plurality of energy systems are assembled to form three planar or curved surfaces to create a seamless aggregate surface across three adjacent walls; and wherein the one or more relay elements each comprise first and second component engineered structures and have a higher transport efficiency in a longitudinal orientation than in a transverse orientation; and wherein the energy relay system is operable to transmit energy waves through the first surface of the one or more energy relay elements with a first resolution and through the second surface of the one or more energy relay elements with a second resolution, and wherein the second resolution is no less than about 50% of the first resolution.

13. The plurality of energy systems of claim 12, wherein a first energy system is configured to direct energy along the respective second plurality of energy propagation paths through the respective energy waveguide system to the respective singular seamless energy surface, and to direct energy along the respective first plurality of energy propagation paths from the respective singular seamless energy surface through the respective energy relay system to the respective plurality of energy devices.

14. The plurality of energy systems of claim 13, wherein a first energy system is configured to direct energy along the respective first plurality of energy propagation paths from the respective plurality of energy devices through the respective energy relay system to the respective singular seamless energy surface, and to direct energy along the respective second plurality of energy propagation paths from the respective singular seamless energy surface through the respective energy waveguide system.

15. The plurality of energy systems of claim 13, wherein the singular seamless energy surface comprises fused or tiled mosaics and any seams between adjacent fused or tiled mosaics are separated by or are less than the minimum perceptible contour as defined by the visual acuity of a human eye having better than 20/40 vision at a distance at or greater than the width or height of a first singular seamless energy surface.

16. The plurality of energy systems of claim 13, wherein a first singular seamless energy surface is operable to guide localized light transmission to within three or less wavelengths of visible light.

17. The plurality of energy systems of claim 13, wherein the plurality of energy systems are assembled to form a single planar or curved surface to create a seamless aggregate surface oriented either in a perpendicular configuration with respect to a floor surface, or in a parallel configuration with respect to a floor surface.

18. The plurality of energy systems of claim 13, wherein the plurality of energy systems are assembled to form four planar or curved surfaces to create a seamless aggregate surface across four enclosed walls.

19. The plurality of energy systems of claim 13, wherein the plurality of energy systems are assembled to form a planar or curved surface to create a seamless aggregate cylindrical surface across any range of angles, volumes and additional combinations of objects in a group comprising: tables, walls, ceiling or floor.

20. The plurality of energy systems of claim 13, wherein the plurality of energy systems are assembled to form a planar or curved surface to create a seamless aggregate spherical or domed surface across any range of angles, volumes and additional combinations of objects in a group comprising: tables, walls, ceiling or floor.

21. The energy system of claim 12, further comprising a reflective waveguide element having an aperture to relay converging energy from the singular seamless energy surface to virtual space.

* * * * *